United States Patent
Mizuochi et al.

(10) Patent No.: US 12,098,520 B2
(45) Date of Patent: Sep. 24, 2024

(54) SITE MANAGEMENT SYSTEM AND WORK MACHINE

(71) Applicant: HITACHI CONSTRUCTION MACHINERY CO., LTD., Tokyo (JP)

(72) Inventors: Mariko Mizuochi, Tokyo (JP); Hiroyuki Yamada, Tokyo (JP); Hiroshi Sakamoto, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 308 days.

(21) Appl. No.: 17/638,996

(22) PCT Filed: Aug. 28, 2020

(86) PCT No.: PCT/JP2020/032554
§ 371 (c)(1),
(2) Date: Feb. 28, 2022

(87) PCT Pub. No.: WO2021/044959
PCT Pub. Date: Mar. 11, 2021

(65) Prior Publication Data
US 2022/0333346 A1 Oct. 20, 2022

(30) Foreign Application Priority Data
Sep. 3, 2019 (JP) ................. 2019-160546

(51) Int. Cl.
*E02F 9/20* (2006.01)
*E02F 9/26* (2006.01)
*H04W 4/029* (2018.01)

(52) U.S. Cl.
CPC .............. *E02F 9/2054* (2013.01); *E02F 9/26* (2013.01); *H04W 4/029* (2018.02)

(58) Field of Classification Search
CPC ... E02F 9/2054; E02F 9/26; E02F 9/24; E02F 9/261; E02F 9/20; H04W 4/029;
(Continued)

(56) References Cited

U.S. PATENT DOCUMENTS 10,927,527 B2 * 2/2021 Machida ................. E02F 9/261
2017/0145663 A1 5/2017 Hiranaka
(Continued)

FOREIGN PATENT DOCUMENTS

| EP | 3832617 A1 | 6/2021 |
|---|---|---|
| JP | 2000-191278 A | 7/2000 |

(Continued)

OTHER PUBLICATIONS

International Search Report of PCT/JP2020/032554 dated Nov. 17, 2020.
(Continued)

*Primary Examiner* — Richard M Camby
(74) *Attorney, Agent, or Firm* — MATTINGLY & MALUR, PC

(57) ABSTRACT

A site management system manages the positions of workers and work areas of work machines. The workers can recognize the work areas of the work machines at a work site in which the work machines and the workers carry out work. A site management device is connected to a worker terminal carried by a worker and a work machine processor is mounted on a work machine 1. The site management device generates worker information 360 on the basis of a signal transmitted from the worker terminal and generates work machine information 350 based on a signal transmitted from the work machine processor. Work area information 380 including the position and the work area of a work machine is generated on the basis of the pieces of information 350 and 360 and a work area notification signal is transmitted (Continued)

with the work area information to the worker terminal device.

9 Claims, 15 Drawing Sheets

(58) Field of Classification Search
CPC ...... H04W 4/021; H04W 4/12; G06Q 10/063; G06Q 50/08; G06Q 50/265; H04L 67/12
See application file for complete search history.

(56) References Cited

U.S. PATENT DOCUMENTS

| | | | |
|---|---|---|---|
| 2018/0245315 A1 | 8/2018 | Kaiso et al. | |
| 2020/0291614 A1 | 9/2020 | Kiyota et al. | |
| 2022/0043617 A1* | 2/2022 | Kamimura | E02F 9/205 |

FOREIGN PATENT DOCUMENTS

| | | |
|---|---|---|
| JP | 2003-105807 A | 4/2003 |
| JP | 2008-101416 A | 5/2008 |
| JP | 2015-209718 A | 11/2015 |
| JP | 2017-193928 A | 10/2017 |
| JP | 2018-141314 A | 9/2018 |
| JP | 2019-27049 A | 2/2019 |
| JP | 2019-60108 A | 4/2019 |
| KR | 10-2017-0003300 A | 1/2017 |
| WO | 2019/111859 A1 | 6/2019 |

OTHER PUBLICATIONS

Korean Office Action received in corresponding Korean Application No. 10-2022-7006835 dated Sep. 13, 2023.
International Preliminary Report on Patentability received in corresponding International Application No. PCT/JP2020/032554 dated Mar. 17, 2022.
Extended European Search Report received in corresponding European Application No. 20859949.8 dated Aug. 4, 2023.
Japanese Office Action received in corresponding Japanese Application No. 2023-111827 dated Jan. 23, 2024.

* cited by examiner

FIG. 2A

WORKER SIGNAL 140

| WORKER ID | TERMINAL POSITION INFORMATION |
|---|---|

FIG. 2B

MACHINE BODY SIGNAL 110

| WORK MACHINE ID | MACHINE BODY POSITION INFORMATION | WORK AREA INFORMATION | WORK AREA NOTIFICATION AREA INFORMATION |
|---|---|---|---|

FIG. 2C

WORK AREA NOTIFICATION SIGNAL 130

| WORK MACHINE ID | MACHINE BODY POSITION INFORMATION | WORK AREA INFORMATION (FIRST MACHINE) | WORK AREA INFORMATION (SECOND MACHINE) | ... | WORK AREA INFORMATION | WORK AREA UPDATE FLAG |
|---|---|---|---|---|---|---|

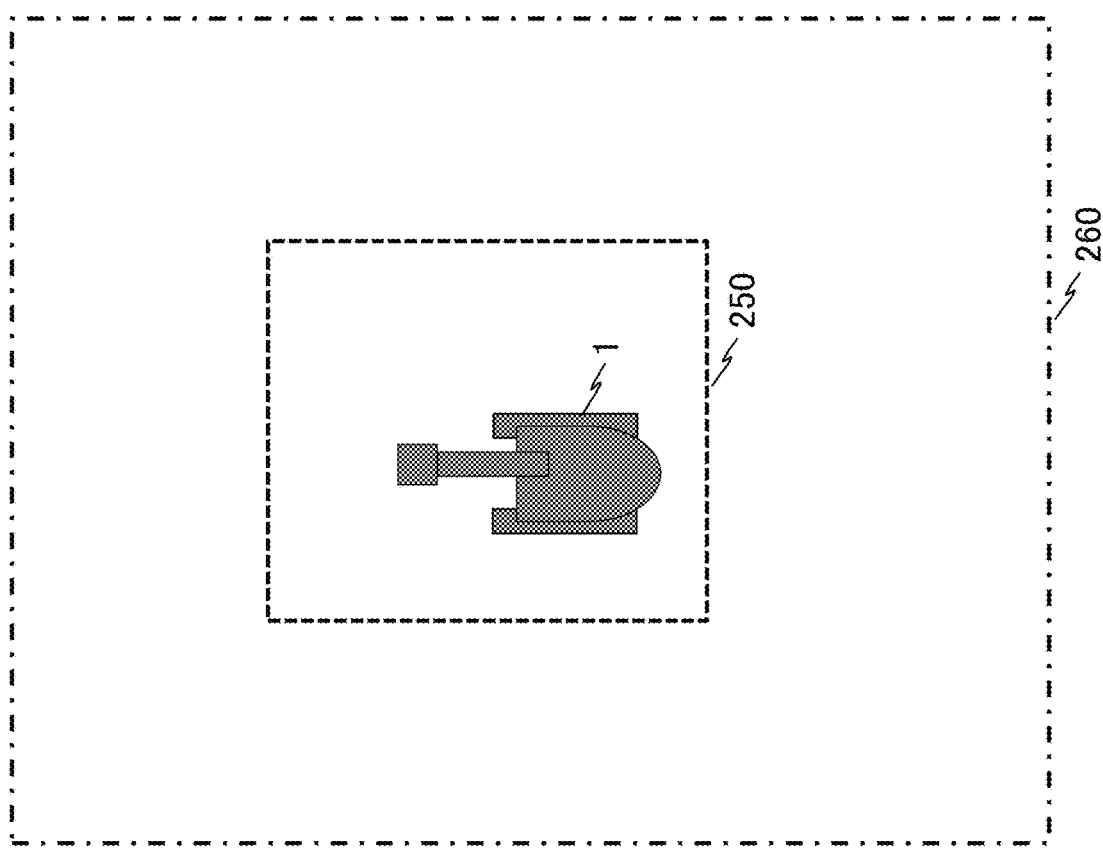

FIG. 6A
WORKER INFORMATION 360

| WORKER ID | POSITION INFORMATION |
|---|---|
| A | Xa, Ya, Za |
| B | Xb, Yb, Zb |
| ... | ... |

FIG. 6B
WORK MACHINE INFORMATION 350

| WORK MACHINE ID | POSITION INFORMATION | WORK AREA INFORMATION | WORK AREA NOTIFICATION AREA INFORMATION |
|---|---|---|---|
| α | $X_\alpha, Y_\alpha, Z_\alpha$ | $R_\alpha$ | $R'_\alpha$ |
| β | $X_\beta, Y_\beta, Z_\beta$ | $R_\beta$ | $R'_\beta$ |
| ... | ... | | |

FIG. 6C
WORK AREA INFORMATION 380

| WORKER ID |
|---|
| A |

| WORK MACHINE ID | POSITION INFORMATION | WORK AREA INFORMATION | WORK AREA UPDATE FLAG |
|---|---|---|---|
| α | $X_\alpha, Y_\alpha, Z_\alpha$ | $R_\alpha$ | 1 |
| δ | $X_\delta, Y_\delta, Z_\delta$ | $R_\delta$ | 0 |
| ε | $X_\varepsilon, Y_\varepsilon, Z_\varepsilon$ | $R_\varepsilon$ | 0 |

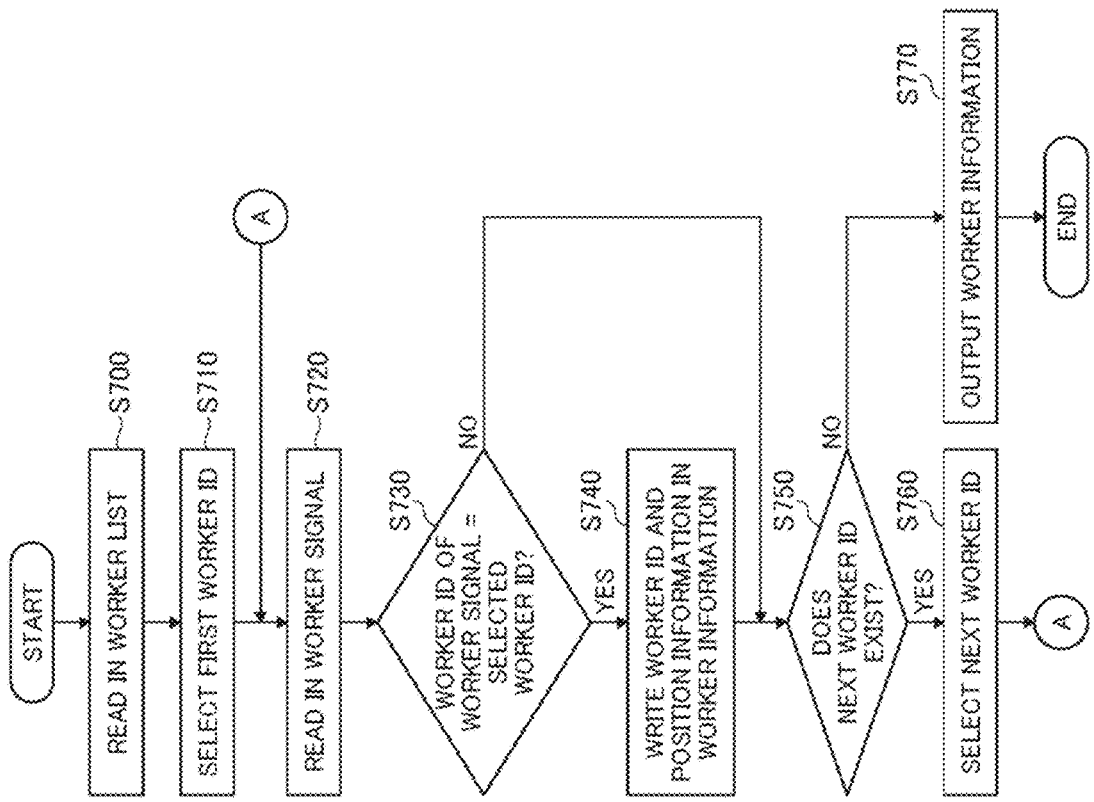

FIG. 12A
WORK AREA CHECK INFORMATION 410

| WORK MACHINE ID | WORK AREA INFORMATION | WORK AREA CHECK FLAG |
|---|---|---|
| α | Rα | 0 |
| δ | Rδ | 1 |
| ... | | |

FIG. 12B
WORKER INFORMATION 360A

| WORKER ID | POSITION INFORMATION | WORK AREA CHECK INFORMATION (WORK MACHINE ID, WORK AREA CHECK FLAG) |
|---|---|---|
| A | $X_A, Y_A, Z_A$ | (α, 0), (δ, 1), ... |
| B | $X_B, Y_B, Z_B$ | (α, 1), (γ, 1), ... |
| ... | | ... |

FIG. 12C
WORKER STATE INFORMATION 390

| WORK MACHINE | WORKER ID | POSITION INFORMATION | WORK AREA CHECK FLAG |
|---|---|---|---|
| ζ | A | $X_A, Y_A, Z_A$ | 0 |
| | B | $X_B, Y_B, Z_B$ | 1 |
| | ... | | ... |

SITE MANAGEMENT SYSTEM AND WORK MACHINE

TECHNICAL FIELD

The present invention relates to a site management system that manages a work site in which work machines are deployed and workers carry out work, and a work machine.

BACKGROUND ART

At a work site of civil work, construction, or the like, according to the contents of work, plural work machines and plural workers are deployed in the site and the work machines and the workers carry out the work while moving in the site. For improvement in the safety and smooth construction management at the work site, preventing unnecessary approach between the worker and the work machine is important. To prevent the approach between the work machine and the worker, it is important to keep the workers from unnecessarily entering the work areas of the work machines and the workers need to grasp the contents of work and the work area regarding the work machines and carry out work in such a manner as not to enter the work areas of the work machines. Thus, conventionally systems for preventing approach between the worker and the work machine have been proposed.

For example, in patent document 1, a safe work support system for the construction machine that intends safety of workers who work around a construction machine is disclosed. This system has a transmitter attached to the construction machine. The transmitter transmits first information toward the surroundings and a smartphone that exists in a predetermined distance range from the construction machine and in which a predetermined safe work support application is installed is caused to receive the first information, thus the smartphone is notified of the existence of the construction machine.

Furthermore, in patent document 2, a construction method is disclosed in which an entry prohibited area is clearly shown around a road roller to allow execution of safer work when a construction is carried out by using the road roller. In this construction method, plural projector devices that project and display video on the road surface are set on the road roller, and work is carried out while a displayed entry prohibited area is moved in association with movement of the road roller in the state in which the entry prohibited area around the road roller is displayed on the road surface by the video projected from the projector devices.

PRIOR ART DOCUMENT

Patent Documents

Patent Document 1: JP-2015-209718-A
Patent Document 2: JP-2017-193928-A

SUMMARY OF THE INVENTION

Problem to be Solved by the Invention

By using the technique of patent document 1, the worker can be caused to recognize approach to the work machine. However, in patent document 1, it is when the worker has approached the work machine that notification to the worker is carried out. It is impossible for the worker to recognize the work area of the work machine that changes along with the progress of work in advance and it is difficult to previously avoid approach to the work area of the work machine.

Furthermore, by using the technique of patent document 2, the worker can be notified of the entry prohibited area around the construction machine that changes along with the progress of work. However, in patent document 2, since the method in which the entry prohibited area is projected on the road surface is employed, the case in which the worker can recognize the entry prohibited area is limited to the case in which the worker is present at a position at which the worker can visually recognize the entry prohibited area and actively checks the road surface. When visibility is poor, such as when the worker and the entry prohibited area are distant or when what obstructs vision exists, or when the road roller exists behind the worker, or when the worker has not checked the road surface, it is impossible to recognize the work area and there is a fear that response for avoiding entry into the work area delays.

The present invention is made in view of the above-described problem and intends to provide a site management system that can manage the positions of workers and the positions and the work areas of work machines and cause the workers to recognize the work areas of the work machines at a work site in which the work machines and the workers carry out work.

Means for Solving the Problem

The present invention employs the following means in order to solve the above-described problem.

Specifically, in the present invention, in a site management system including a site management device connected to a worker terminal device carried by a worker and a work machine information processing device mounted in a work machine, the site management device is configured to generate worker information including the position of the worker terminal device on the basis of a worker signal transmitted from the worker terminal device, generate work machine information including the position of the work machine and a work area in which the work machine operates on the basis of a machine body signal transmitted from the work machine information processing device, and generate work area information including the position of the work machine and the work area on the basis of the worker information and the work machine information and transmit a work area notification signal including the work area information to the worker terminal device.

Advantages of the Invention

According to the present invention, it becomes possible to manage the positions of workers and the positions and the work areas of work machines and cause the workers to recognize the work areas of the work machines at a work site in which the work machines and the workers carry out work. This allows the workers to always recognize the work areas of the work machines and avoid careless entry into the work area.

BRIEF DESCRIPTION OF THE DRAWINGS

FIG. 2A is a diagram illustrating the configuration of a worker signal transmitted and received by the site management system.

FIG. 2B is a diagram illustrating the configuration of a machine body signal transmitted and received by the site management system.

FIG. 2C is a diagram illustrating the configuration of a work area notification signal transmitted and received by the site management system.

FIG. 5 is a diagram illustrating one example of a work area and a work area notification area of the work machine.

FIG. 6A is a diagram illustrating worker information generated in the site management system.

FIG. 6B is a diagram illustrating work machine information generated in the site management system.

FIG. 6C is a diagram illustrating work area information generated in the site management system.

FIG. 7 is a diagram illustrating the processing flow of generation of the worker information in a worker information generating section.

FIG. 12A is a diagram illustrating work area check information generated in the site management system.

FIG. 12B is a diagram illustrating worker information generated in the site management system.

FIG. 12C is a diagram illustrating worker state information generated in the site management system.

MODES FOR CARRYING OUT THE INVENTION

Figure 1:
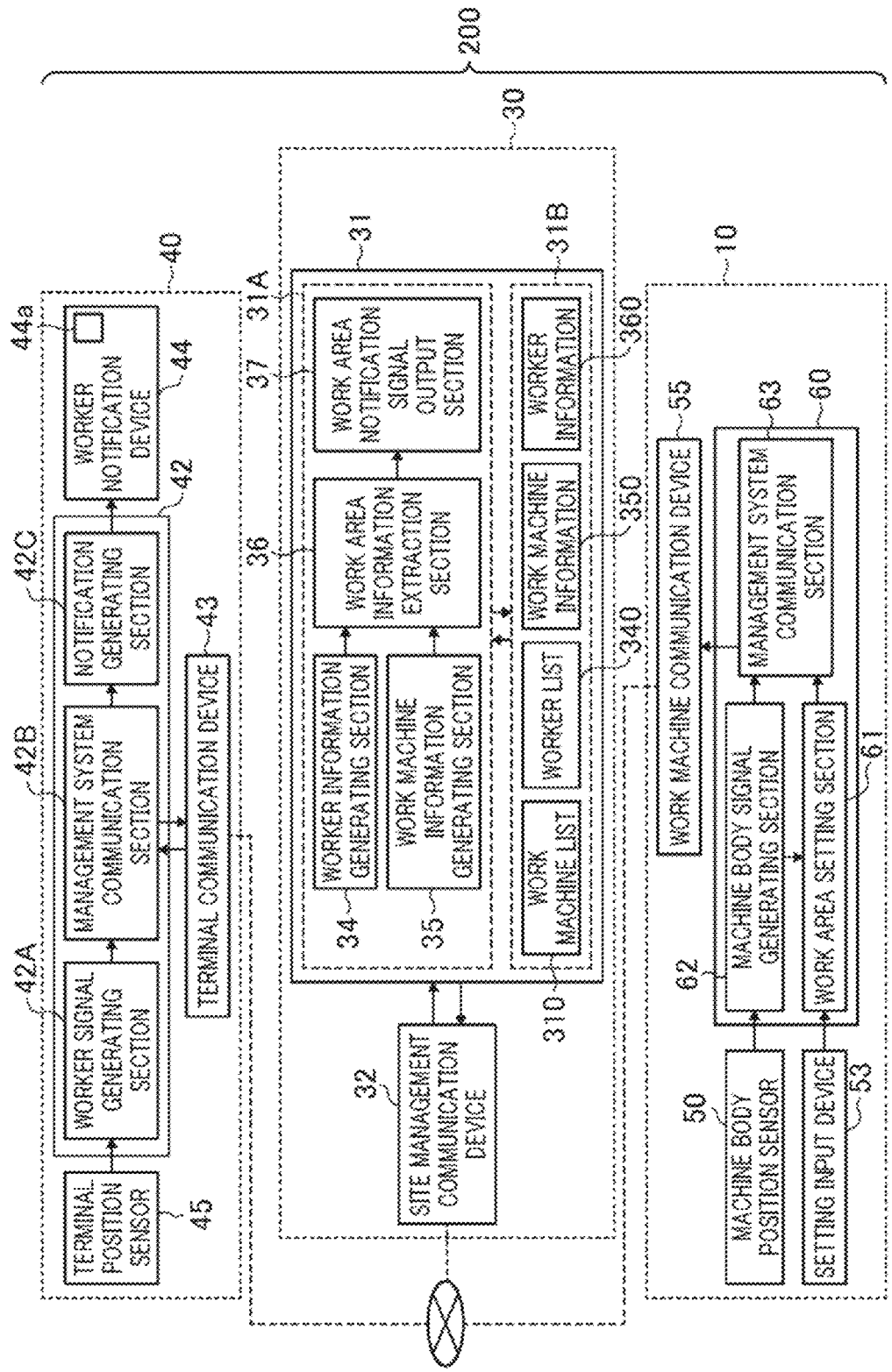
FIG. 1 is a diagram illustrating the schematic configuration of a site management system according to a first embodiment of the present invention.

Embodiments of a site management system according to the present invention will be described below with reference to the drawings.

First Embodiment

<Outline and Overall Configuration>

At a work site of civil work, construction, or the like, according to required work, plural work machines 1 (see FIG. 3A and FIG. 3B) and plural workers 100 (same) are deployed in the work site and the work machines 1 and the workers 100 carry out the work while moving in the work site. Furthermore, in the work site, a supervisor (work supervisor) that carries out planning of the construction and construction management of construction quality and progress, safety measures, and so forth is deployed. A work area 250 (same) is set for the work machine 1 and the work machine 1 carries out work with various changes in the posture in the work area 250. The work area 250 is changed in association with the progress of the work of the work machine 1. When the worker 100 does not recognize the work area 250 of the work machine 1 and carelessly enters the work area 250, the worker 100 excessively approaches the work machine in some cases. Furthermore, the work machine 1 needs to be decelerated or stopped when the worker 100 has excessively approached the work machine 1, and the work efficiency lowers. Therefore, it is important to cause the worker 100 to correctly recognize the work area 250 of the work machine 1 changed in association with the progress of work, for avoidance of approach of the worker and improvement in the work efficiency.

FIG. 1 is a diagram illustrating the schematic configuration of a site management system 200 according to a first embodiment. FIG. 2A, FIG. 2B, and FIG. 2C are diagrams illustrating the configurations of signals transmitted and received by the site management system 200.

The site management system 200 of the present embodiment uses a worker terminal device 40 carried by the worker 100 and a work machine information processing device 10 mounted in the work machine 1 to acquire and manage the positions of the workers 100 who move in the work site and the positions and the work areas 250 of the work machines 1 and notify the worker 100 in the vicinity (work area notification area 260) of the work machine 1 about the work area 250 of the work machine 1.

As illustrated in FIG. 1, the site management system 200 is composed mainly of the worker terminal device 40 carried by the worker 100, the work machine information processing device 10 mounted in the work machine 1, and a site management device 30 set at a work site management office or the like. The worker terminal device 40, the work machine information processing device 10, and the site management device 30 are connected to each other by wireless communication based on a wireless network in the site, a mobile phone network, or the like.

The worker terminal device 40 is, for example, a terminal carried by the worker, such as a smartphone, and includes a terminal position sensor 45, a worker notification device 44, and so forth. The worker terminal device 40 outputs a worker signal 140 including its own position information to the site management device 30 and notifies the worker 100 about the work area of the work machine 1 on the basis of a work area notification signal 130 output from the site management device 30. The work machine information processing device 10 is a device mounted in the work machine 1 and includes a machine body position sensor 50, a setting input device 53, and so forth, and outputs a machine body signal 110 including position information of the machine itself and work area information to the site management device 30. The site management device 30 manages the position of the worker 100 in the work site and the position and the work area of the work machine 1 on the basis of the worker signal 140 output from the worker terminal device 40 and the machine body signal 110 output from the work machine information processing device 10. Furthermore, the site management device 30 determines whether or not notification of the work area of the work machine 1 is necessary based on the positional relation between the worker 100 and the work machine 1 and outputs the work area notification signal 130 that notifies the worker 100 who exists in a predetermined area (work area notification area 260—see FIG. 5) about the work area 250 of the work machine 1 from the work machine 1. The transmission and reception of signals are carried out by, for example, wireless communication in which the transmission destination is specified. As above, through the notification of the work area 250 of the work machine 1 to the worker 100 near the work machine 1, the worker 100 can always recognize the work area 250 of the work machine 1 and it becomes possible to avoid careless entry into the work area 250 previously.

In the following, details of the worker terminal device 40, the work machine information processing device 10, and the site management device 30 will be described.

<Worker Terminal Device>

The worker terminal device 40 is a smartphone, tablet terminal, or wearable device, for example, and the worker 100 is made to always carry the worker terminal device 40. The same number of worker terminal devices 40 as the number of workers 100 deployed in the work site exist. As illustrated in FIG. 1, the worker terminal device 40 includes the terminal position sensor 45, a worker terminal computation device 42, a worker terminal communication device 43, and the worker notification device 44 and is driven by a power supply part that is not illustrated in the diagram.

The terminal position sensor 45 is a device that receives radio waves from a positioning satellite and outputs three-dimensional position data of the worker terminal device 40. The terminal position sensor 45 includes a GNSS receiving antenna that receives radio waves from the positioning satellite and a position information calculating section that demodulates the received radio waves and calculates the three-dimensional position of the worker terminal device 40, and outputs three-dimensional position data calculated in a global coordinate system to the worker terminal computation device 42.

The worker terminal computation device 42 is composed of a worker signal generating section 42A, a management system communication section 42B, and a notification generating section 42C.

The worker signal generating section 42A combines the position information input from the terminal position sensor 45 and a worker ID that has been input in advance and is to identify the worker 100 who carries each worker terminal device 40 and generates the worker signal 140 like one illustrated in FIG. 2A.

The management system communication section 42B outputs a command to the worker terminal communication device 43 so as to transmit the worker signal 140 output by the worker signal generating section 42A to the site management device 30. Furthermore, the management system communication section 42B outputs the work area notification signal 130 received through the worker terminal communication device 43 to the notification generating section 42C.

Figure 3B:
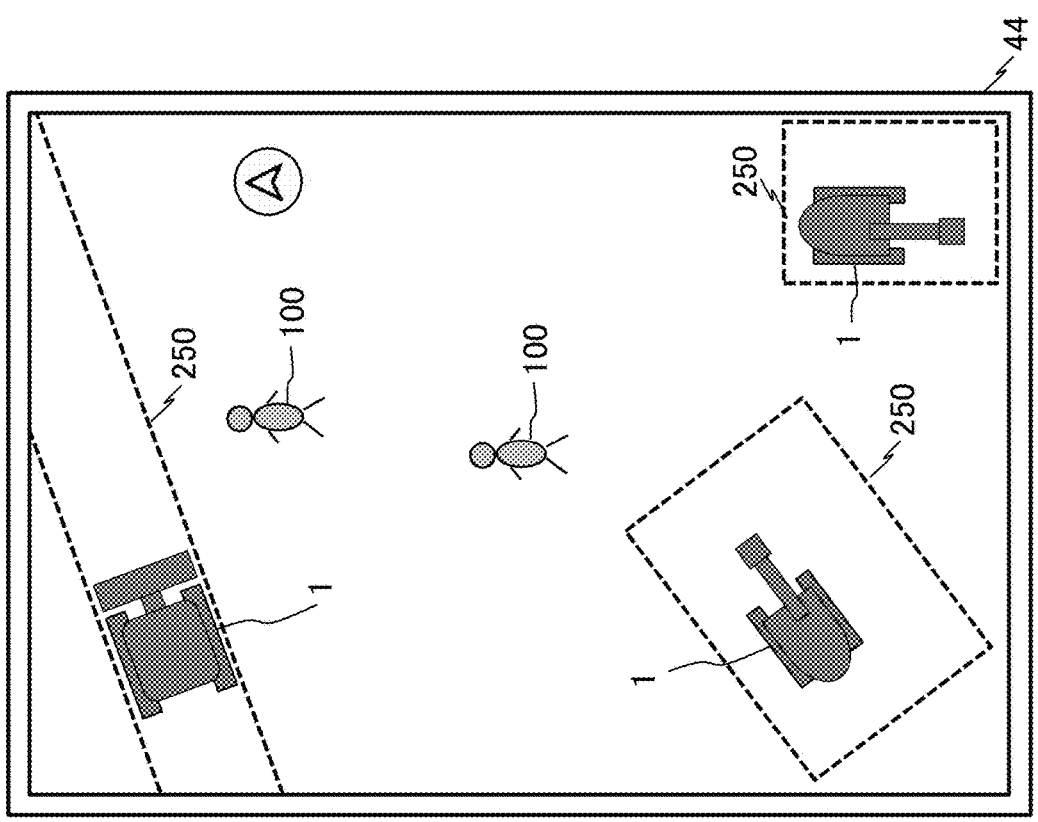
FIG. 3B is a diagram illustrating another display example of the worker terminal device.
Figure 3A:
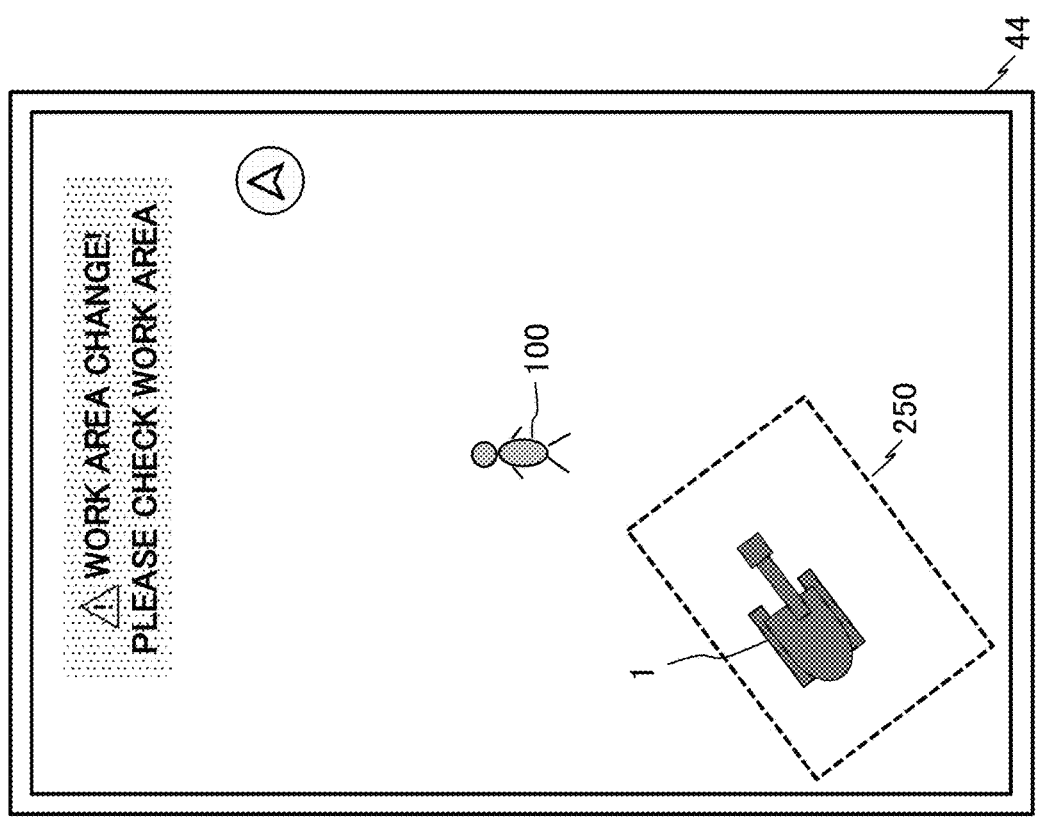
FIG. 3A is a diagram illustrating a display example of a worker terminal device.

The notification generating section 42C generates a signal for notifying the worker 100 about the work area 250 of the work machine 1 on the basis of the work area notification signal 130 and outputs a notification command to the worker notification device 44. As illustrated in FIG. 2C, the work area notification signal 130 is a signal in which pieces of work area information for the number of corresponding work machines are stored and each piece of work area information is composed of a work machine ID, the position of the work machine, the work area, and a work area update flag. As one example of the notification, for example, when the work area information in which the work area update flag is "1" exists, work area change for the work machine 1 is notified by using a vibration generating device and a speaker included in the worker notification device 44. Furthermore, regarding the work area information in which the update flag is "1," display showing the positional relation between the worker 100 and the work machine 1 and the work area 250 of the work machine 1 is carried out on a monitor included in the worker notification device 44. FIG. 3A and FIG. 3B are diagrams illustrating display examples of the worker notification device 44. For example, as illustrated in the display example of FIG. 3A, an illustration of the work machine 1 and the worker 100 and the work area 250 are displayed and a message to make an instruction to check change in the work area ("Work area change! Please check work area" or the like) is displayed. By notifying about the work area information only when the work area update flag is "1," the notification can be carried out only when change has been caused in the work area or when the worker 100 has newly entered the work area notification area 260 in association with movement of the worker 100. By making such a configuration, only information that should be truly checked can be notified to the worker 100 even when a large number of work machines are operating at the work site.

The notification generating section 42C may carry out display showing all pieces of work area information included in the work area notification signal 130 together with the positions of the workers 100 as illustrated in the display example of FIG. 3B in addition to the notification of change in the work area.

Furthermore, the notification generating section 42C may display an illustration of the work machine 1 and the worker 100 and the work area 250 on the monitor irrespective of whether the update flag is "1" or "0," and display the message of "Work area change! Please check work area" as illustrated in FIG. 3A only when the update flag is "1."

The worker terminal communication device 43 transmits the worker signal 140 to the site management device 30 and receives the work area notification signal 130 from the site management device 30 by using the wireless network in the work site, the mobile phone network, or the like.

The worker notification device 44 includes the monitor, the speaker, the vibration generating device, and so forth as described above and notifies the worker 100 about the work area of the work machine 1 by using visual information, auditory information, vibration, and so forth in response to the notification command from the notification generating section 42C. Furthermore, the worker notification device 44 has an operation part 44*a* such as a switch, and display on the monitor and actuation of the speaker and the vibration generating device can be stopped through operation of the operation part 44*a* (for example, pressing of a switch) by the worker.

<Work Machine Information Processing Device>

The work machine information processing device 10 is composed of the machine body position sensor 50, the setting input device 53, a work machine computation device 60, and a work machine communication device 55 and is mounted in the work machine 1. The work machine information processing device 10 generates the machine body signal 110 like that illustrated in FIG. 2B on the basis of the position information of the work machine 1 sensed by the machine body position sensor 50 and the work area set through the setting input device 53, and transmits the machine body signal 110 to the site management device 30 through the wireless network in the work site, the mobile phone network, or the like.

Figure 4:
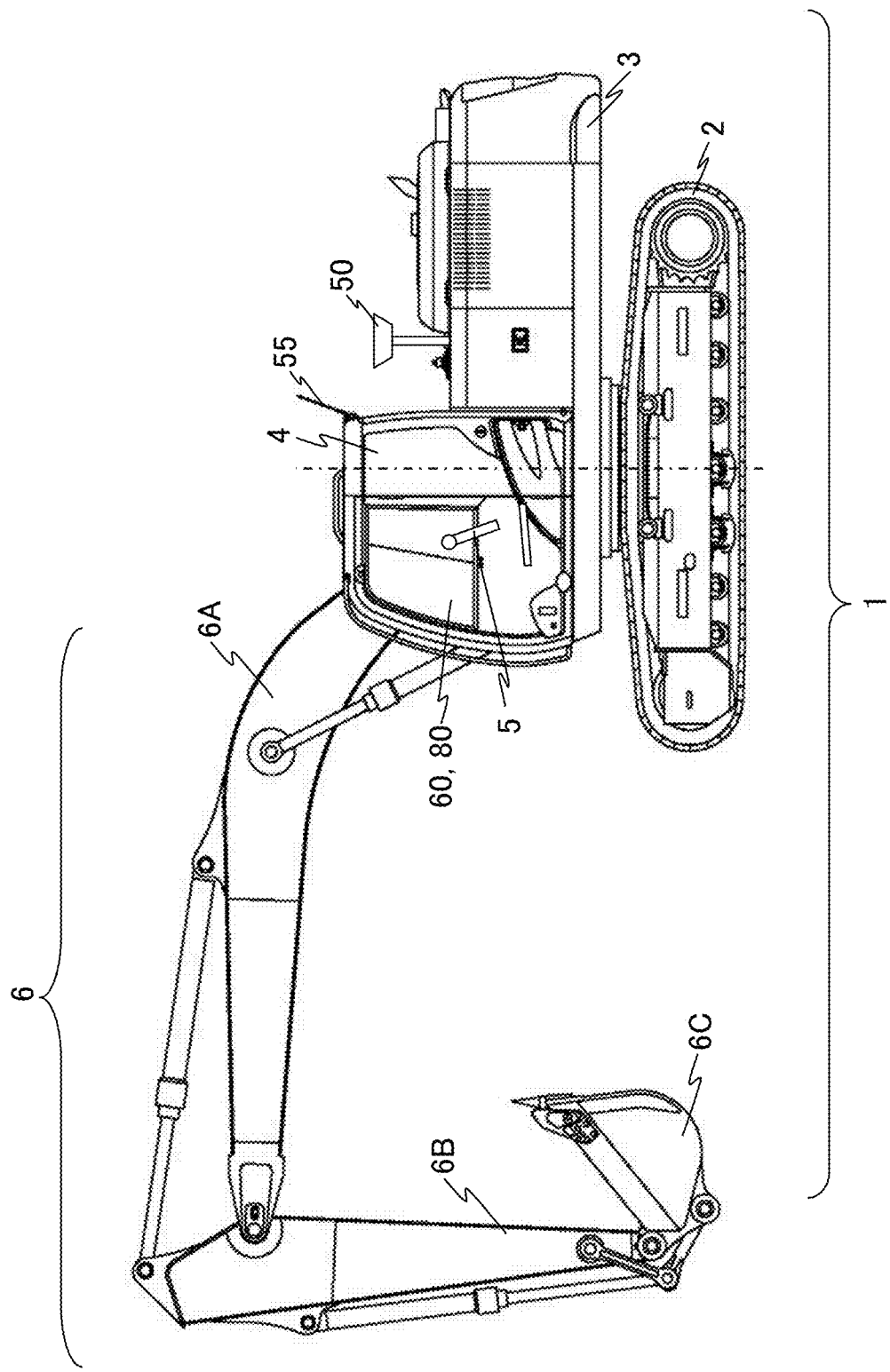
FIG. 4 is a side view of a hydraulic excavator that is one example of a work machine.

At the work site to which the site management system 200 of the present embodiment is introduced, work machines such as hydraulic excavator, bulldozer, and wheel loader are used according to the contents of construction. FIG. 4 is a side view of a hydraulic excavator that is one example of the work machines. In the following, details of the work machine information processing device 10 will be described by taking as an example the case in which the work machine information processing device 10 is mounted in a hydraulic excavator like that illustrated in FIG. 4.

The work machine 1 of FIG. 4 includes a track structure 2, a swing structure 3 swingably attached to the upper part of the track structure 2, and a work front implement 6 formed of an articulated link mechanism whose one end is joined to the swing structure 3. The work front implement 6 has a boom 6A whose one end is joined to the swing structure 3, an arm 6B whose one end is joined to the other end of the boom 6A, and a bucket 6C whose one end is joined to the other end of the arm 6B, and these respective members are configured to be each pivoted in the upward-downward direction. An operation room (cabin) 4 is disposed on the swing structure 3. Furthermore, at the required part on this swing structure 3, an engine that configures a power system, a drive hydraulic circuit of drive actuators, and so forth are disposed. In the operation room 4, an operation lever 5 for allowing an operator to input instructions of motion to the respective drive actuators is disposed. Through operation of the operation lever 5, travelling, swing, and various kinds of operation by use of the work front implement 6 are carried out. In the operation room 4, besides the operation lever 5, a notification device 80 (see FIG. 10) for notifying the operator of the work machine 1 about various kinds of information and the above-described setting input device 53 and work machine computation device 60 are disposed. Furthermore, the work machine 1 is equipped with the machine body position sensor 50 and the work machine communication device 55 that configure the work machine information processing device 10.

Details of the machine body position sensor 50, the setting input device 53, the work machine computation device 60, and the work machine communication device 55 will be described below.

The machine body position sensor 50 is a device that receives radio waves from the positioning satellite and outputs three-dimensional position data of the work machine 1. The machine body position sensor 50 includes a GNSS receiving antenna that receives radio waves from the positioning satellite and a position information calculating section that demodulates the received radio waves and calculates the three-dimensional position of the work machine 1, and outputs three-dimensional position data calculated in the global coordinate system to the work machine computation device 60.

The setting input device 53 is an input device used for setting of the work area 250 of the work machine 1, and so forth, and the setting input device 53 outputs input information to the work machine computation device 60.

The work machine computation device 60 is a computation device that is composed of a CPU that is not illustrated in the diagram, a storing section formed of ROM (Read Only Memory), RAM (Random Access Memory), flash memory, and so forth, a microcomputer including them, a peripheral circuit that is not illustrated in the diagram, and so forth and operates in accordance with a program stored in the ROM, for example. The work machine computation device 60 generates the machine body signal 110 including information on its own position and the work area on the basis of information from the machine body position sensor 50 and the setting input device 53 and outputs the machine body signal 110 to the work machine communication device 55.

In the following, details of the work machine computation device 60 of the present embodiment will be described with reference to FIG. 1 and FIG. 5.

The work machine computation device 60 is composed of a work area setting section 61, a machine body signal generating section 62, and a management system communication section 63.

The work area setting section 61 sets the work area 250 and the work area notification area 260 on the basis of input from the setting input device 53. It suffices that the work area 250 and the work area notification area 260 be set in a desired coordinate system such as a machine body coordinate system set on the work machine 1, a global coordinate system, or a site coordinate system set in each work site.

FIG. 5 is a diagram illustrating one example of the work area 250 and the work area notification area 260 of the work machine 1. The work area 250 is the area in which the work machine 1 operates as described above. The work machine 1 carries out work only in the set work area 250 and the work area 250 is changed in association with the progress of the work. Furthermore, the work area notification area 260 is the existence area of the worker 100 (worker terminal device 40) that should be notified of the work area 250 of the work machine 1. When the work site is wide, a very large number of work machines 1 operate and it is difficult for the worker 100 to correctly recognize the work areas of all work machines. Thus, in the present embodiment, the work area notification area 260 is set around the work area 250 and only the worker 100 in the work area notification area 260 is notified of the work area 250.

As a setting method of the work area 250, for example, a method is cited in which the operator of the work machine 1 sets the work area 250 by operating the setting input device 53 according to the contents of work and the progress of the work. As another setting method, a method is cited in which the work area 250 of each work step is set in advance by using the setting input device 53 and the work area 250 is switched according to the progress of the work. The work area notification area 260 may be configured to be set by using the setting input device 53 at the time of setting of the work area 250 or an area set in advance may be used as an area unique to the work machine 1.

The setting input device 53 causes, when inputting the work area 250 and the work area notification area 260 to the work area setting section 61, a monitor of the setting input device to display the input work area 250 and work area notification area 260 together with an illustration of the work machine 1 as illustrated in FIG. 5.

The machine body signal generating section 62 generates the machine body signal 110 to be transmitted to the site management device 30 on the basis of an output signal from the machine body position sensor 50 and the output of the work area setting section 61. As illustrated in FIG. 2B, the machine body signal 110 is a signal including the work machine ID to identify the work machine 1 in which the work machine information processing device 10 is mounted, the position information of the work machine 1 input from the machine body position sensor 50, and pieces of information on the work area 250 and the work area notification area 260 set in the work area setting section 61. When the work area 250 and the work area notification area 260 are set in a machine body coordinate system, a site coordinate system set in each work site, or the like, transformation to a global coordinate system is carried out and the machine body signal 110 is generated.

The management system communication section 63 outputs a command to the work machine communication device 55 so as to transmit the machine body signal 110 output by the machine body signal generating section 62 to the site management device 30.

The work machine communication device 55 is a device that carries out communication with the site management device 30 by using the wireless network in the work site, the mobile phone network, or the like and transmits the machine body signal 110 generated by the work machine computation device 60 to the site management device 30.

<Site Management Device>

The site management device 30 is composed of a controller 31 for site management and a site management communication device 32 and is set at a management office or the like in the work site. The site management device 30 is connected to the worker terminal device 40 and the work machine information processing device 10 by the wireless network in the site, the mobile phone network, or the like and receives the worker signal 140 transmitted from the worker terminal device 40 and the machine body signal 110 transmitted from the work machine information processing device 10. By using these signals, the site management device 30 manages the positions of the worker 100 and the work machine 1 in the work site and the work area of the work machine 1 and extracts the work area information that should be notified to the worker 100 to transmit the work area notification signal 130 to the worker terminal device 40.

In the following, details of the respective sections of the site management device 30 will be described with reference to FIG. 1 and FIG. 6A to FIG. 9.

[Controller for Site Management]

The controller 31 for site management is composed of a CPU that is not illustrated in the diagram, a storing section formed of ROM (Read Only Memory), RAM (Random Access Memory), flash memory, and so forth, a microcomputer including them, a peripheral circuit that is not illustrated in the diagram, and so forth and operates in accordance with a program stored in the ROM, for example.

Furthermore, the controller 31 for site management includes a storing section 31B that holds various kinds of information and a computation section 31A that carries out predetermined computation by using signals input from the site management communication device 32 and the information held by the storing section 31B. Details of the storing section 31B and the computation section 31A of the controller 31 for site management in the present embodiment will be described below.

Storing Section

The storing section 31B holds information necessary for the computation carried out by the computation section 31A and outputs the held information in response to a command from the computation section 31A. As illustrated in FIG. 1, in the present embodiment, a work machine list 310, a worker list 340, work machine information 350, and worker information 360 are held.

The work machine list 310 is a list of the work machines 1 that operate in the work site. In the present embodiment, as the work machine list 310, for example, a list in which the work machine ID unique to each work machine 1, the type of work machine 1, and information on the operator of the work machine 1 are associated with each other is held.

The worker list 340 is a list of the workers 100 who are working in the work site. In the present embodiment, as the worker list 340, for example, a list in which the worker ID unique to each worker and attributes of the worker are associated with each other is held. The attributes of the worker include the full name of the worker and information to discriminate the operator of the work machine 1, assistant worker, peripheral worker, supervisor, and so forth. Furthermore, the attributes of the worker may include information on the company to which the worker belongs, years of experience, and so forth and may be caused to have an index into which they are integrated.

FIG. 6A, FIG. 6B, and FIG. 6C are diagrams illustrating the work machine information 350, the worker information 360, and work area information 380 to be described later.

The work machine information 350 is what is obtained by listing information on the position, the work area, and so forth regarding the work machines 1 in the work site as illustrated in FIG. 6B and is generated in the computation section 31A.

The worker information 360 is what is obtained by listing information on the position and so forth regarding the workers 100 in the work site as illustrated in FIG. 6A and is generated in the computation section 31A.

Details of the work machine information 350 and the worker information 360 will be described later.

Computation Section

The computation section 31A is composed of a worker information generating section 34, a work machine information generating section 35, a work area information extraction section 36, and a work area notification signal output section 37. Details of the respective sections will be described below.

Worker Information Generating Section

The worker information generating section 34 generates the worker information 360 by using the reception result of the worker signal 140 received by the site management communication device 32 and the worker list 340 stored in the storing section 31B.

As illustrated in FIG. 6A, the worker information 360 is what is obtained by writing information on the position to each worker ID. Based on the reception result of the worker signal 140, the worker information 360 is generated regarding all worker IDs described in the worker list 340. The generated worker information 360 is output to the work area information extraction section 36 and is stored in the storing section 31B.

FIG. 7 is a diagram illustrating the processing flow of generation of the worker information 360 in the worker information generating section 34.

In the worker information generating section 34, first, the worker list 340 is read in (step S700) and the first worker ID (ID="A") is selected from among the worker IDs included in the worker list 340 (step S710). Subsequently, the worker signal 140 is read in (step S720) and it is determined whether the worker ID included in the worker signal 140 corresponds to the selected worker ID (step S730). When the included worker ID corresponds to the selected worker ID, the worker ID and position information are written in the worker information 360 (step S740).

The above is what relates to the worker whose worker ID is "A." After the worker ID and the position information are written in the worker information 360, similar processing is executed regarding all worker IDs included in the worker list 340 (steps S750 and S760). When the similar processing has been completed regarding all worker IDs, the worker information 360 is output and is stored in the storing section 31B (step S770).

Work Machine Information Generating Section

The work machine information generating section 35 generates the work machine information 350 by using the reception result of the machine body signal 110 received by the site management communication device 32 and the work machine list 310 stored in the storing section 31B.

As illustrated in FIG. 6B, the work machine information 350 is what is obtained by writing information on the position, the work area, and the work area notification area 260 to each work machine ID. Based on the reception result of the machine body signal 110, the work machine information 350 is generated regarding all work machine IDs described in the work machine list 310. The generated work machine information 350 is output to the work area information extraction section 36 and is stored in the storing section 31B.

Figure 8:
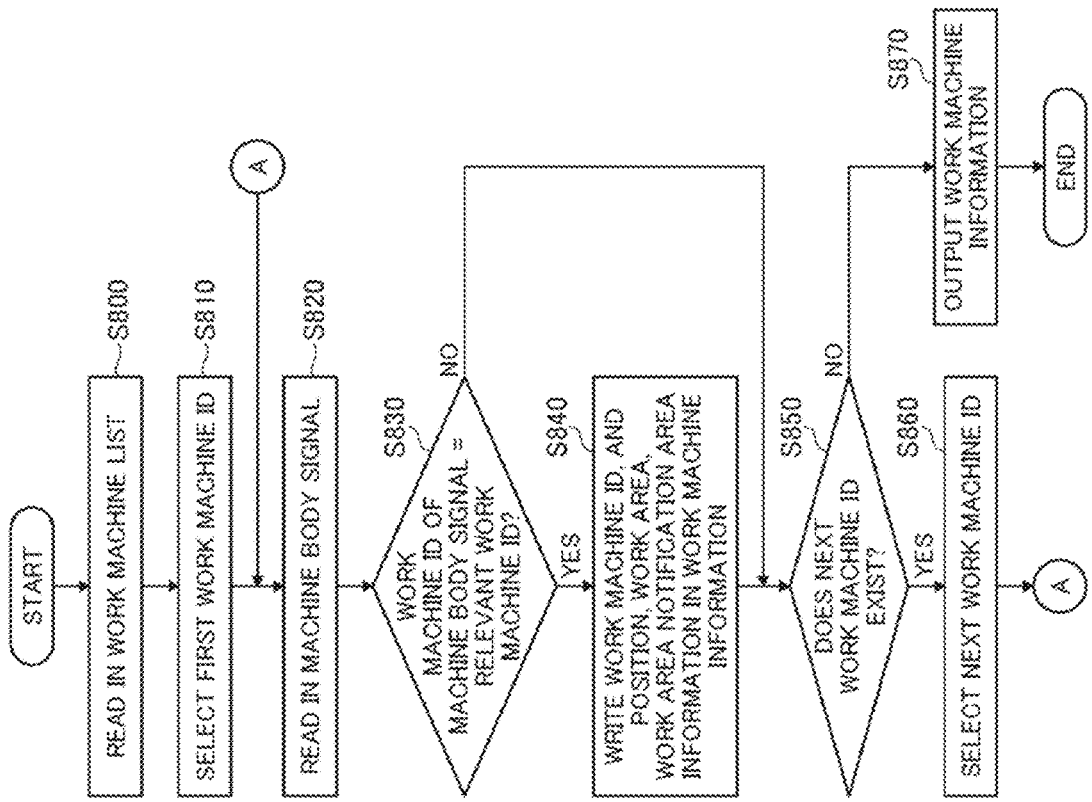
FIG. 8 is a diagram illustrating the processing flow of generation of the work machine information in a work machine information generating section.

FIG. 8 is a diagram illustrating the processing flow of generation of the work machine information 350 in the work machine information generating section 35.

In the work machine information generating section 35, first, the work machine list 310 is read in (step S800) and the first work machine ID (ID="α") is selected from among the work machine IDs included in the work machine list 310 (step S810). Subsequently, the machine body signal 110 is read in (step S820) and it is determined whether the work machine ID included in the machine body signal 110 corresponds to the selected work machine ID (step S830). When the included work machine ID corresponds to the selected work machine ID, the work machine ID, and information on the position, the work area and the work area notification area 260 are written in the work machine information 350 (step S840).

The above is what relates to the work machine whose work machine ID is "α." After the work machine ID and information on the position, the work area, and the work area notification area 260 are written in the work machine information 350, similar processing is executed regarding all work machine IDs included in the work machine list 310 (steps S850 and S860). When the similar processing has been completed regarding all work machine IDs, the work machine information 350 is output and is stored in the storing section 31B (step S870).

Work Area Information Extraction Section

The work area information extraction section 36 extracts the work area information that should be notified to each worker terminal device by using the worker information 360 generated by the worker information generating section 34 and the work machine information 350 generated by the work machine information generating section 35, and generates the work area information 380 for each worker ID.

As illustrated in FIG. 6C, the work area information 380 is composed of the work machine ID, the position, the work area, and the work area update flag. In the site management system of the present embodiment, the work area information 380 is generated and the work area 250 is notified only to the worker 100 who exists in the work area notification area 260 of each work machine.

Figure 9:
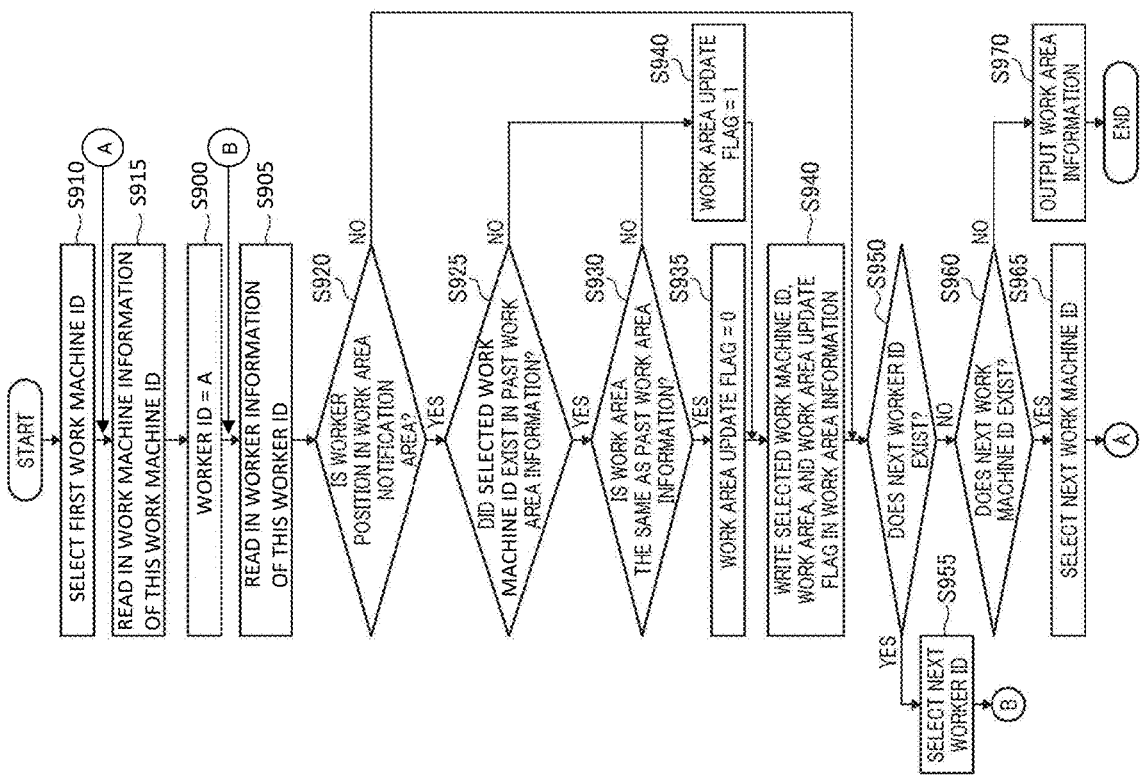
FIG. 9 is a diagram illustrating the processing flow of generation of the work area information in a work area information extraction section.

FIG. 9 is a diagram illustrating the processing flow of generation of the work area information 380 in the work area information extraction section 36.

In the work area information extraction section 36, the first work machine ID included in the work machine information 350 is selected (step S910) and the work machine information 350 of this work machine is read in (step S915). Subsequently, the first worker ID (ID="A") is selected from among the worker IDs included in the worker list 340 (step S900) and the position information of this worker ID included in the worker information 360 is read in (step S905). Next, based on information on the work area notification area 260 of the work machine information 350, it is determined whether or not the existence position of the selected worker is in the work area notification area 260 of said work machine (step S920). When the existence position is in the work area notification area 260, it is determined whether or not the work area of said work machine existed in the past work area information 380 (for example, work area information 380 generated in the previous control cycle) (step S925). When the work area existed, it is further determined whether or not this work area is the same as that included in the past work area information 380 (for example, work area information 380 generated in the previous control cycle) (step S930). When the work area is the same, the work area update flag showing whether or not the work area has been changed from that included in the past work area information 380 is set to "0" (step S935). On the other hand, when the work machine did not exist in the past work area information 380 and when the work area is different from that included in the past work area information 380, the work area update flag is set to "1" (step S940). Then, the selected work machine ID, the position and the work area information of the relevant work machine, and the work area update flag are written in the work area information 380 as information that should be notified to the worker 100 (step S945).

The above is what relates to the worker whose worker ID is "A." Similar processing is executed regarding all worker IDs included in the worker list 340 (steps S950 and S955).

Furthermore, the above is what corresponds to the case in which the work machine ID is the first work machine ID included in the work machine information 350. Similar processing is executed regarding all work machine IDs included in the work machine information 350 (steps S960 and S965). When the similar processing has been completed regarding all work machine IDs, the work area information 380 is output to the work area notification signal output section 37 (step S970).

Work Area Notification Signal Output Section

The work area notification signal output section 37 converts the work area information 380 generated by the work area information extraction section 36 to the work area notification signal 130 and outputs a command to the site management communication device 32 so as to transmit the work area notification signal 130 to the corresponding worker terminal device 40. As illustrated in FIG. 2C, the work area notification signal 130 is a signal in which pieces of work area information for the number of corresponding work machines are stored and each piece of work area information is composed of the work machine ID, the position of the work machine, the work area, and the work area update flag. In the work area notification signal output section 37, regarding all worker IDs described in the worker list 340, pieces of information corresponding to the work machine IDs stored in the work area information 380 are linked to each other as pieces of work area information to be made into the work area notification signal 130.

[Site Management Communication Device]

The site management communication device 32 is a device that carries out communication with the worker terminal device 40 and the work machine information processing device 10 by using the wireless network in the work site, the mobile phone network, or the like. The site management communication device 32 receives the worker signal 140 from the worker terminal device 40 and the machine body signal 110 from the work machine information processing device 10 and outputs them to the controller 31 for site management. Furthermore, the site management communication device 32 transmits the work area notification signal 130 to the worker terminal device 40 in response to a command from the controller 31 for site management.

According to the present embodiment configured as above, effects shown below are obtained.

1. The site management device 30 generates the worker information 360 including the position of the worker terminal device 40 on the basis of the worker signal 140 transmitted from the worker terminal device 40 and generates the work machine information 350 including the position of the work machine 1 and the work area 250 in which the work machine 1 operates on the basis of the machine body signal 110 transmitted from the work machine information processing device 10. Furthermore, the site management device 30 generates the work area information 380 including the position of the work machine 1 and the work area 250 on the basis of the worker information 360 and the work machine information 350 and transmits the work area notification signal 130 including the work area information 380 to the worker terminal device 40.

Due to this, at the work site in which the worker 100 and the work machine 1 work, the position of the worker 100 and the position and the work area 250 of the work machine 1 can be managed in the site management device 30 on the basis of the signals from the worker terminal device 40 and the work machine information processing device 10. Furthermore, it becomes possible to notify the worker 100 about the work area 250 of the work machine 1, and the worker 100 can always recognize the work area 250 of the work machine 1 and avoid careless entry into the work area 250.

2. The worker terminal device 40 receives the work area notification signal 130 transmitted from the site management device 30 and notifies the worker 100 about the work area 250 of the work machine 1 on the basis of the work area notification signal 130.

This allows the worker 100 to always recognize the work area 250 of the work machine 1 and previously prevent entry into the work area 250.

3. The site management device 30 generates, as the work machine information 350, information including the work area notification area 260 that is set in a predetermined range of the work machine 1 and is the existence area of the worker terminal device 40 that should be notified of the work area 250 in addition to the position and the work area 250 of the work machine 1 on the basis of the machine body signal 110 transmitted from the work machine information processing device 10, and generates the work area information 380 when the position of the worker terminal device 40 is in the work area notification area 260.

Due to this, notification by use of the worker terminal device 40 is carried out when the position of the worker is in the work area notification area 260. Therefore, even when a large number of work machines 1 exist in the work site, the worker 100 can easily check information on the work machine 1 deeply related to oneself.

4. The site management device 30 generates information including work area update information as the work area information 380 when the work area 250 of the work machine 1 is different from the work area 250 included in the work area notification signal 130 of the past.

Due to this, notification is carried out only when change has been caused in the work area. Therefore, even when a large number of work machines 1 are operating at the work site, only the information that should be truly checked can be notified to the worker 100.

5. The site management device 30 generates information including the work area update information as the work area information 380 in either the case in which the work area 250 of the work machine 1 is different from the work area 250 included in the past work area notification signal 130 or the case in which the worker terminal device 40 enters the new work area notification area 260 and the work area 250 of the work machine that is new is caused to be included in the work area information 380.

Due to this, notification is carried out not only when change has been caused in the work area but also when the worker 100 has newly entered the work area notification area 260 in association with movement of the worker 100. Thus, even when a large number of work machines 1 are operating at the work site, only the information that should be truly checked can be notified to the worker 100.

<Change Examples>

Change examples of the present embodiment will be described below.

[Change Example of Work Area Notification Signal]

In the above-described embodiment, the example has been shown in which, in the controller 31 for site management, the work area of the work machine about which the position of the relevant worker 100 is in the work area notification area 260 in the work machines 1 that are operating at the work site is extracted and is transmitted to the worker terminal device 40 as the work area notification signal 130. Meanwhile, the case in which notification to the worker 100 needs to be carried out is the case in which change has been caused in the work area 250 or the case in which the worker 100 has newly entered the work area notification area 260 in association with movement of the worker 100 or change in the work area notification area 260 of the work machine. In the above-described embodiment, the example has been shown in which whether or not update of the work area exists is represented by using the work area update flag of the work area notification signal 130. However, only the work area information that involves change from the previous transmission may be caused to be included in the work area notification signal 130. In such a case, in the work area notification signal output section 37, only information in which the update flag is "1" in the work area information 380 is extracted and is made into the work area notification signal 130. Employing such a configuration makes it possible to reduce the data amount of the work area notification signal 130. Furthermore, determination of whether or not update of the work area exists is unnecessary at the time of notification generation in the worker terminal device 40 and it becomes possible to reduce the amount of computation processing of the worker terminal device 40.

[Change Example of Coordinate Example]

In the above-described embodiment, the example has been shown in which the position information of the worker included in the worker signal 140, the position information of the work machine included in the machine body signal 110, the work area 250, and the work area notification area 260 are treated in a global coordinate system. However, the coordinate system does not necessarily need to be the global coordinate system and a site coordinate system set in the work site, or the like, may be used. Furthermore, the configuration may be made in such a manner that the work area 250 and the work area notification area 260 are treated as a machine body coordinate system in the work machine information processing device 10 and the work area 250 and the work area notification area 260 are transformed into another coordinate system in the site management device 30 on the basis of the position information of the work machine.

[Change Example of Setting Method of Work Area Notification Area]

In the above-described embodiment, the example in which the work area notification area 260 of the work machine 1 is set by the work area setting section 61 of the work machine information processing device 10 has been shown. However, the work area notification area 260 does not necessarily need to be set in the work machine information processing device 10 and may be configured to be set in the site management device 30. In such a case, the work area notification area 260 may be defined in advance for each work machine 1 in consideration of characteristics of each work machine and the work area notification area 260 corresponding to the work machine ID may be stored in the work machine list 310. Furthermore, the work area notification area 260 may be configured to be changed according to the size of the work area 250 and be set in the work machine information generating section 35 of the controller 31 for site management. By employing such a configuration, labor of setting by the operator of the work machine 1 can be saved. In addition, it becomes possible to reduce the data amount of the machine body signal 110.

[Additional Example of Transmission Signal of Site Management Device]

In the above-described embodiment, the example in which the work area notification signal 130 is transmitted from the site management device 30 to the worker terminal device 40 has been shown. However, the configuration may be made in such a manner that the work area notification signal 130 is transmitted also to the work machine information processing device 10 in addition to the worker terminal device 40. In such a configuration, in the work area information extraction section 36 of the controller 31 for site management, the work area information 380 is generated regarding all work machine IDs described in the work machine list 310 in addition to all worker IDs described in the worker list 340. Furthermore, in the work area notification signal output section 37, the work area notification signal 130 is generated regarding all work machine IDs in addition to all worker IDs and a command is output to the site management communication device 32 so as to transmit the work area notification signal 130 to the work machine information processing device 10 in addition to the worker terminal device 40. In addition, the site management communication device 32 transmits the work area notification signal 130 to the work machine information processing device 10 in addition to the worker terminal device 40. The work machine information processing device 10 includes the work machine notification device 80 (see FIG. 10) in addition to the above-described embodiment. The work machine communication device 55 of the work machine information processing device 10 receives the work area notification signal 130 transmitted by the site management device 30. The work machine notification device 80 notifies the operator of the work machine 1 about the work areas of other work machines on the basis of the work area notification signal 130. Making the configuration as above makes it possible to notify the operator of the work machine 1 about the work areas of other work machines 1 that are carrying out work nearby and makes it possible to previously prevent careless approach between the work machines.

[Change Example of Setting Place of Site Management Device]

In the above-described embodiment, the example in which the site management device 30 is set at a management office or the like in the work site has been shown. However, the site management device 30 may be set at any place as long as it can be connected to the worker terminal device 40 and the work machine information processing device 10 through communication. As examples of another setting place, an example in which the site management device 30 is mounted on the work machine 1 and an example in which the site management device 30 is configured on a cloud computing system are cited, for example.

Second Embodiment

Next, a second embodiment of the present invention will be described. In the following, details of the second embodiment will be described with reference to FIG. 10 to FIG. 15B. Regarding the same configuration as the first embodiment, the same numeral is used and description is omitted.

Figure 10:
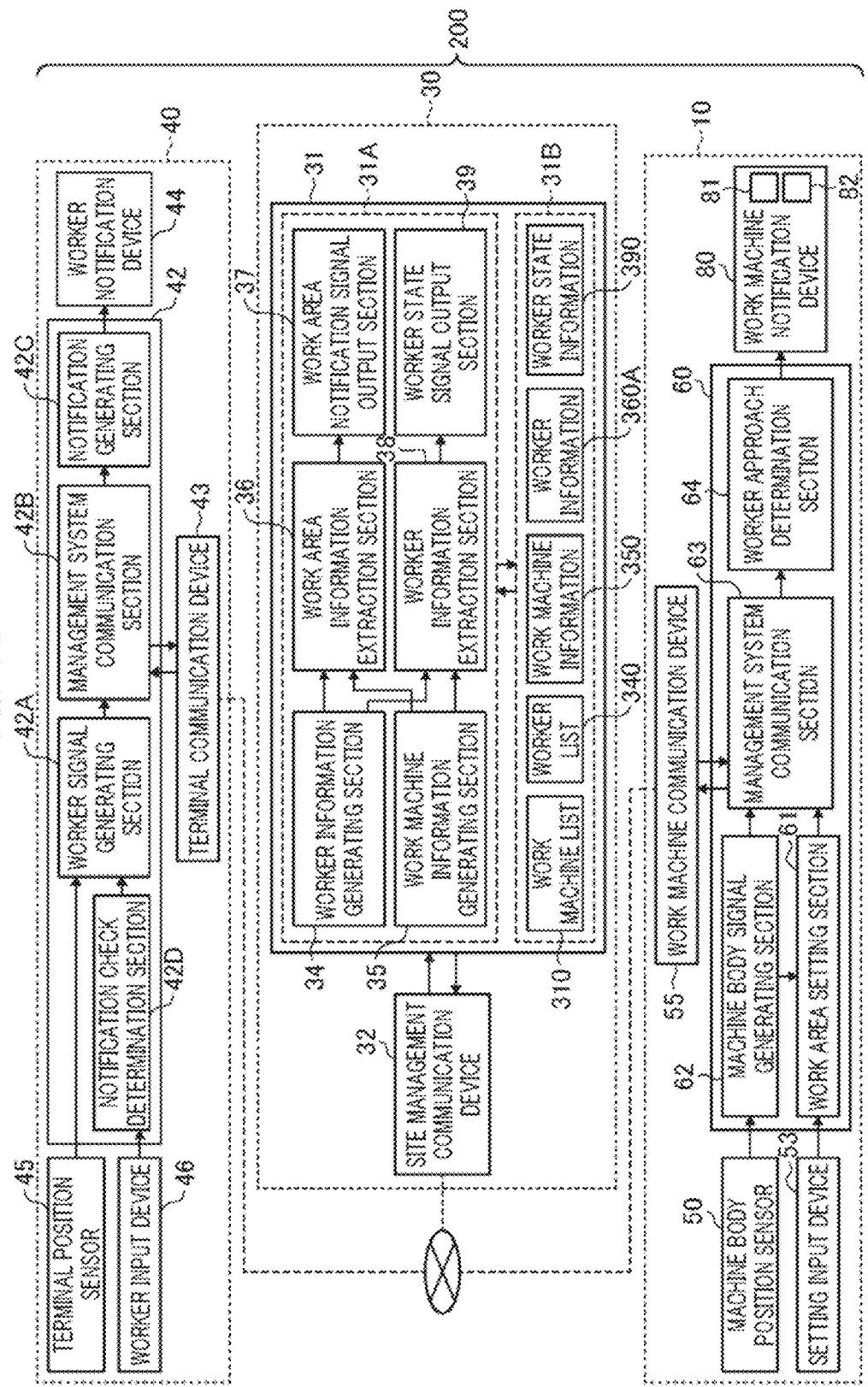
FIG. 10 is a diagram illustrating the schematic configuration of the site management system according to a second embodiment.

FIG. 10 is a diagram illustrating the schematic configuration of the site management system 200 according to the second embodiment. In the second embodiment, the site management device 30 transmits the position and the work area check status of the worker 100 near the work machine 1 to the work machine information processing device 10 and the work machine information processing device 10 notifies the operator of the work machine 1 about approach of the worker 100.

<Worker Terminal Device>

In the second embodiment, the worker terminal device 40 includes a worker input device 46 in addition to the configuration of the first embodiment.

The worker input device 46 is an input device for allowing the worker 100 who carries the worker terminal device 40 to input a response to notification of the worker notification device 44.

Figure 11A:
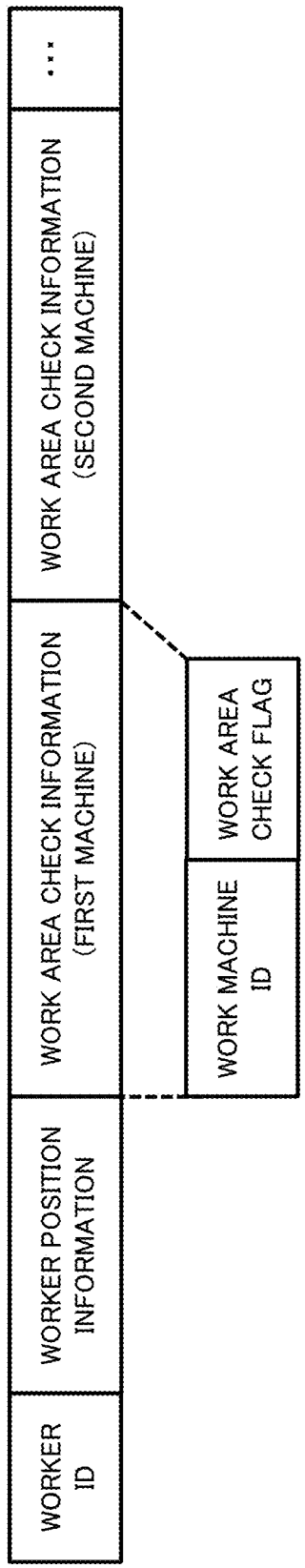
FIG. 11A is a diagram illustrating the configuration of the worker signal transmitted and received by the site management system.
Figure 11B:
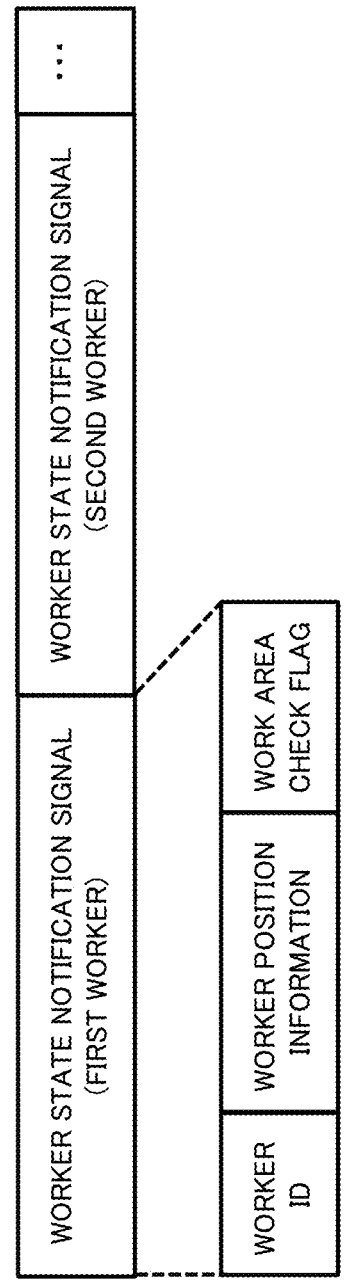
FIG. 11B is a diagram illustrating the configuration of a worker state notification signal transmitted and received by the site management system.

FIG. 11A and FIG. 11B are diagrams illustrating the configurations of signals transmitted and received by the site management system. FIG. 12A, FIG. 12B, and FIG. 12C are diagrams illustrating pieces of information generated in the site management system.

The worker terminal computation device 42 includes a notification check determination section 42D in addition to the configuration of the first embodiment and generates the worker signal 140 illustrated in FIG. 11A in the worker signal generating section 42A.

The notification check determination section 42D determines whether or not the worker 100 has checked notification of the worker notification device 44 on the basis of the work area notification signal 130 and input of the worker input device 46, and generates work area check information 410 like that illustrated in FIG. 12A. The work area check information 410 is what is obtained by listing the work machine ID, the work area, and the work area check flag (work area check result). When check by the worker 100 has been carried out, the work area check flag is set to "1." When check has not been carried out, the work area check flag is set to "0." The work area check information 410 is generated regarding all work machine IDs included in the work area notification signal 130 and is output to the worker signal generating section 42A.

The worker signal generating section 42A generates the worker signal 140 illustrated in FIG. 11A on the basis of position information input from the terminal position sensor 45 and the work area check information 410 generated by the notification check determination section 42D. The worker signal 140 is a signal in which the worker ID to identify the worker 100 who carries the worker terminal device 40, the position information of the worker terminal device 40, and work area check information are stored. The work area check information is composed of the work machine ID and the work area check flag and pieces of the work area check information for the number of work machine IDs included in the work area notification signal 130 are stored in the worker signal 140.

<Site Management Device>

The site management device 30 of the second embodiment has a configuration similar to that of the first embodiment. However, the computation section 31A of the controller 31 for site management includes a worker information extraction section 38 and a worker state signal output section 39 in addition to the configuration described in the first embodiment and the site management communication device 32 transmits a worker state notification signal 150 to the work machine information processing device 10 in addition to transmission of the work area notification signal 130 to the worker terminal device 40.

[Controller for Site Management]

Worker Information Generating Section

The worker information generating section 34 generates worker information 360A by using the reception result of the worker signal 140 received by the site management communication device 32 and the worker list 340 stored in the storing section 31B. As illustrated in FIG. 12B, the worker information 360A is what is obtained by writing the position and the work area check information to each worker ID. The worker information 360A is generated regarding all worker IDs included in the worker list 340. The generated worker information 360A is output to the work area information extraction section 36 and the worker information extraction section 38 and is stored in the storing section 31B.

Worker Information Extraction Section

The worker information extraction section 38 extracts the worker information that should be notified to each work machine information processing device 10 by using the worker information 360A generated by the worker information generating section 34 and the work machine information 350 (see FIG. 6B) generated by the work machine information generating section 35, and generates worker state information 390 for each work machine ID.

As illustrated in FIG. 12C, the worker state information 390 is composed of the worker ID, the position, and the work area check flag (work area check result). The site management system of the second embodiment notifies the work machine information processing device 10 about the position and the work area check status of the worker 100 who exits in the work area notification area 260 of the work machine 1 in which the work machine information processing device 10 is mounted.

Figure 13:
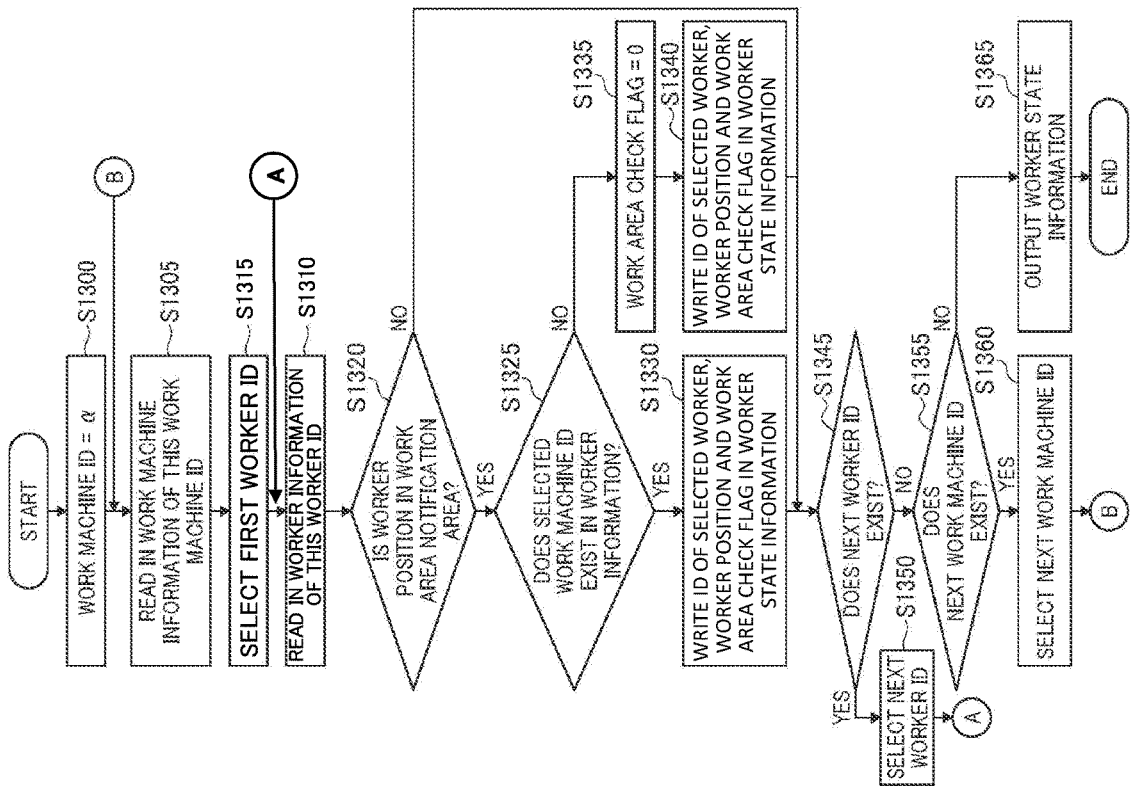
FIG. 13 is a diagram illustrating the processing flow of generation of the worker state information in a worker information extraction section.

FIG. 13 is a diagram illustrating the processing flow of generation of the worker state information 390 in the worker information extraction section 38.

In the worker information extraction section 38, the first work machine ID (ID="α") is selected from among all work machine IDs described in the work machine list 310 (step S1300) and the work machine information 350 (see FIG. 6B) of this work machine ID is read in (step S1305). Furthermore, the first worker ID included in the worker information 360A is selected (step S1315), and subsequently, the worker information 360A of this worker ID generated in the worker information generating section 34 is read in (step S1310) and it is determined whether or not each worker exists in the work area notification area 260 on the basis of information on the work area notification area 260 included in the work machine information 350 and the position information of the worker included in the worker information 360A (step S1320). When the worker is outside the work area notification area 260, writing in the worker state information 390 is not carried out regarding the relevant worker ID. When the worker is in the work area notification area 260, it is checked whether the work machine ID of the selected work machine is included in the work area check information of the worker information 360A (step S1325). When the work machine ID is included, the worker ID, the worker position, and the work area check flag are written in the worker state information 390 (step S1330). Furthermore, when the work machine ID of the selected work machine is not included in the work area check information of the worker information 360, in the worker state information 390, the work area check flag is set to "0" (step S1335) and the worker ID, the worker position, and the work area check flag are written (step S1340).

Similar processing is executed regarding all worker IDs included in the worker information 360A (steps S1345 and S1350).

The above is what corresponds to the work machine information processing device 10 whose work machine ID is "α." Similar processing is executed regarding all work machine IDs described in the work machine list 310 (steps S1355 and S1360). When the similar processing has been completed regarding all work machine IDs, the worker state information 390 is output (step S1365).

Worker State Signal Output Section

The worker state signal output section 39 converts the worker state information 390 generated by the worker information extraction section 38 to the worker state notification signal 150 and outputs a command to the site management communication device 32 so as to transmit the worker state notification signal 150 to the corresponding work machine information processing device 10. As illustrated in FIG. 11B, the worker state notification signal 150 is a signal in which pieces of worker state information for the number of corresponding workers are stored. Each piece of worker state information is composed of the worker ID, the position information, and the work area check flag. In the worker state signal output section 39, regarding all work machine IDs described in the work machine list 310, pieces of information corresponding to the worker IDs stored in the worker state information 390 are linked to each other to generate the worker state notification signal 150.

[Site Management Communication Device]

The site management communication device 32 receives the worker signal 140 from the worker terminal device 40 and the machine body signal 110 from the work machine information processing device 10 and outputs them to the controller 31 for site management. Furthermore, in response to a command from the controller 31 for site management, the site management communication device 32 transmits the work area notification signal 130 to the worker terminal device 40 and transmits the worker state notification signal 150 to the work machine information processing device 10.

<Work Machine Information Processing Device>

The work machine information processing device 10 of the second embodiment includes the work machine notification device 80 in addition to the configuration described in the first embodiment. The work machine communication device 55 carries out reception of the worker state notification signal 150 in addition to transmission of the machine body signal 110. Furthermore, the work machine computation device 60 includes a worker approach determination section 64 in addition to the configuration described in the first embodiment and notifies the operator of the work machine 1 about approach of the worker 100.

[Work Machine Notification device]

The work machine notification device 80 is a device for notifying the operator of the work machine 1 about approach of the worker. In the present embodiment, the work machine information processing device 10 includes a display device 81 and a warning device 82 as the notification device 80.

The display device 81 is a device formed of a liquid crystal panel or the like and is set in the operation room 4 of the work machine 1. The display device 81 is used for notifying the operator of the work machine 1 about information on the worker around the work machine 1 by visual information and carries out display on the basis of a display command from the work machine computation device 60.

The warning device 82 is a device that can generate sound, voice, or the like and is set in the operation room 4 of the work machine 1. The warning device 82 is used for notifying the operator of the work machine 1 about information on the worker around the work machine 1 by auditory information and generates warning sound or the like on the basis of a warning command from the work machine computation device 60.

[Work Machine Communication Device]

The work machine communication device 55 transmits the machine body signal 110 generated by the work machine computation device 60 to the site management device 30 and receives the worker state notification signal 150 from the site management device 30.

[Work Machine Computation Device]

Management System Communication Section

The management system communication section 63 outputs a command to the work machine communication device 55 so as to transmit the machine body signal 110 output by the machine body signal generating section 62 to the site management device 30. Furthermore, the management system communication section 63 outputs the worker state notification signal 150 received through the work machine communication device 55 to the worker approach determination section 64.

Worker Approach Determination Section

The worker approach determination section 64 determines approach of the worker on the basis of the worker state notification signal 150 and generates a notification command to the work machine notification device 80. The command of notification is changed depending on whether or not the worker 100 exists near the work area 250 of the work machine 1. Various processing methods of the worker approach determination section 64 are conceivable. In the following, an example of the case in which the notification is changed according to the work area check status of the worker 100 will be described.

In the worker approach determination section 64, two kinds of approach notification areas 270, i.e. first and second approach notification areas (270A and 270B), are set outside the work area 250. The first approach notification area 270A is what is used regarding the worker 100 who has checked the work area 250 of the work machine 1. The second approach notification area 270B is what is used regarding the worker 100 who has not checked the work area 250 of the work machine 1. The second approach notification area 270B is set wider than the first approach notification area 270A (outside the first approach notification area 270A). The worker approach determination section 64 determines whether or not approach notification is necessary based on the first and second, two approach notification areas 270A and 270B and the position and the work area check flag of each worker ID included in the worker state notification signal 150.

Figure 14:
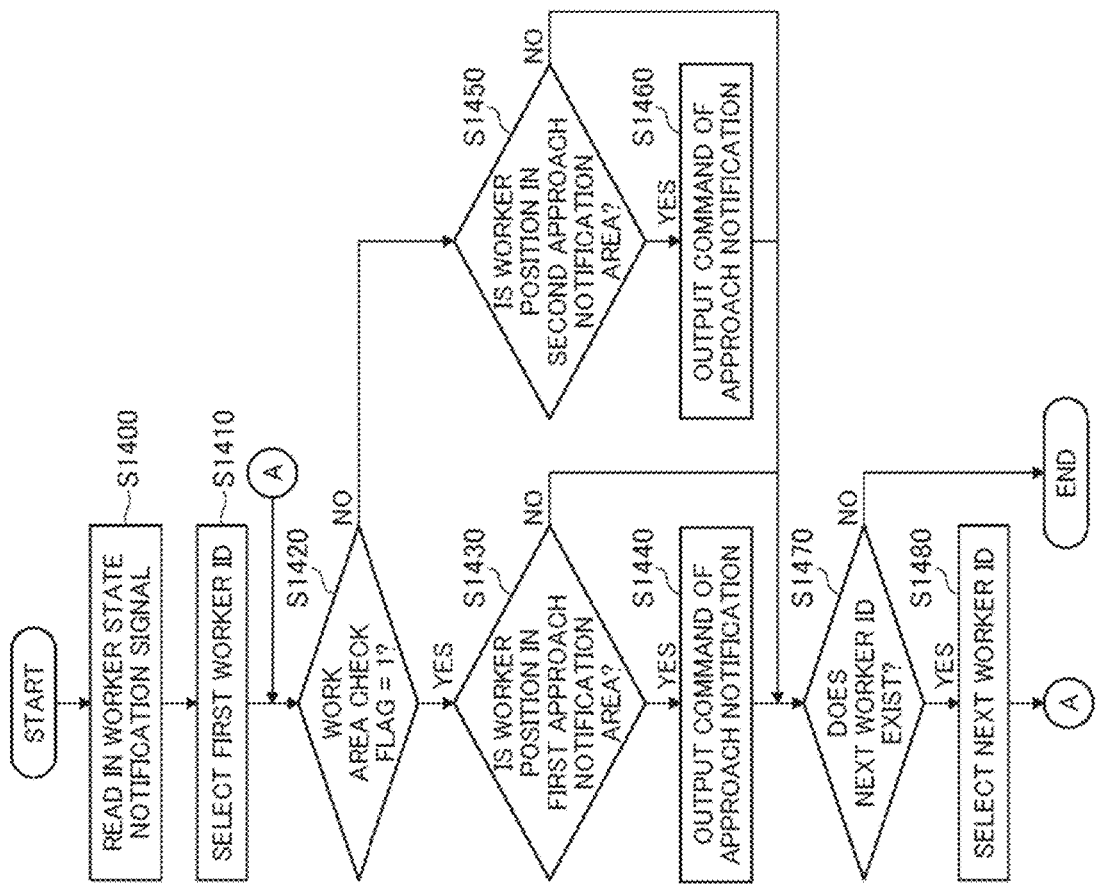
FIG. 14 is a diagram illustrating the processing flow of approach determination in a worker approach determination section.

FIG. 14 is a diagram illustrating the processing flow of the approach determination in the worker approach determination section 64.

In the worker approach determination section 64, first, the worker state notification signal 150 is read in (step S1400) and the first worker ID is selected from the worker IDs included in the worker state notification signal 150 (step S1410). Then, it is determined whether the work area check flag included in the worker state notification signal 150 is "1" (step S1420). When the work area check flag is "1," it is determined whether the position of the worker is in the first approach notification area 270A (step S1430). When the position of the worker is in the first approach notification area 270A, a command of approach notification is made (step S1440). When the position of the worker is outside the first approach notification area 270A, the command of approach notification is not made. Furthermore, when the work area check flag is "0," it is determined whether the position of the worker is in the second approach notification area 270B (step S1450). When the position of the worker is in the second approach notification area 270B, a command of approach notification is made (step S1460). When the position of the worker is outside the second approach notification area 270B, the command of approach notification is not made. Such processing is executed regarding all pieces of worker state information included in the worker state notification signal 150 (steps S1470 and S1480).

Figure 15B:
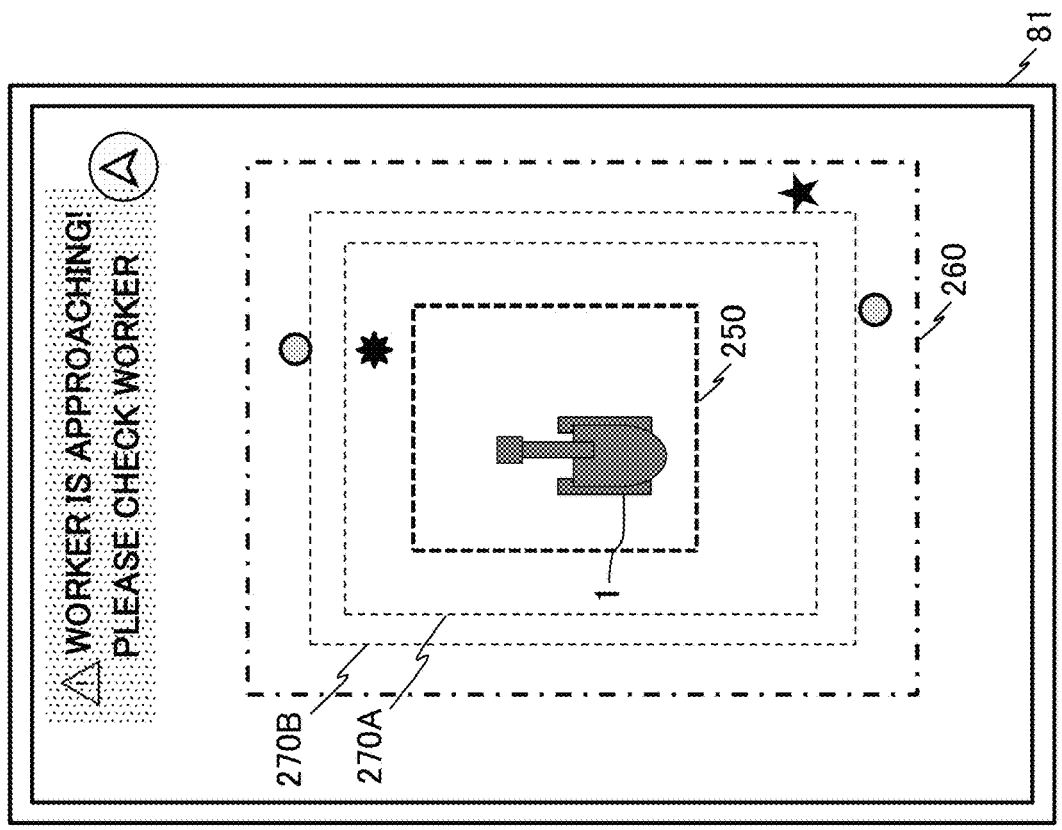
FIG. 15B is a diagram illustrating another display example of the display device of the work machine notification device.
Figure 15A:
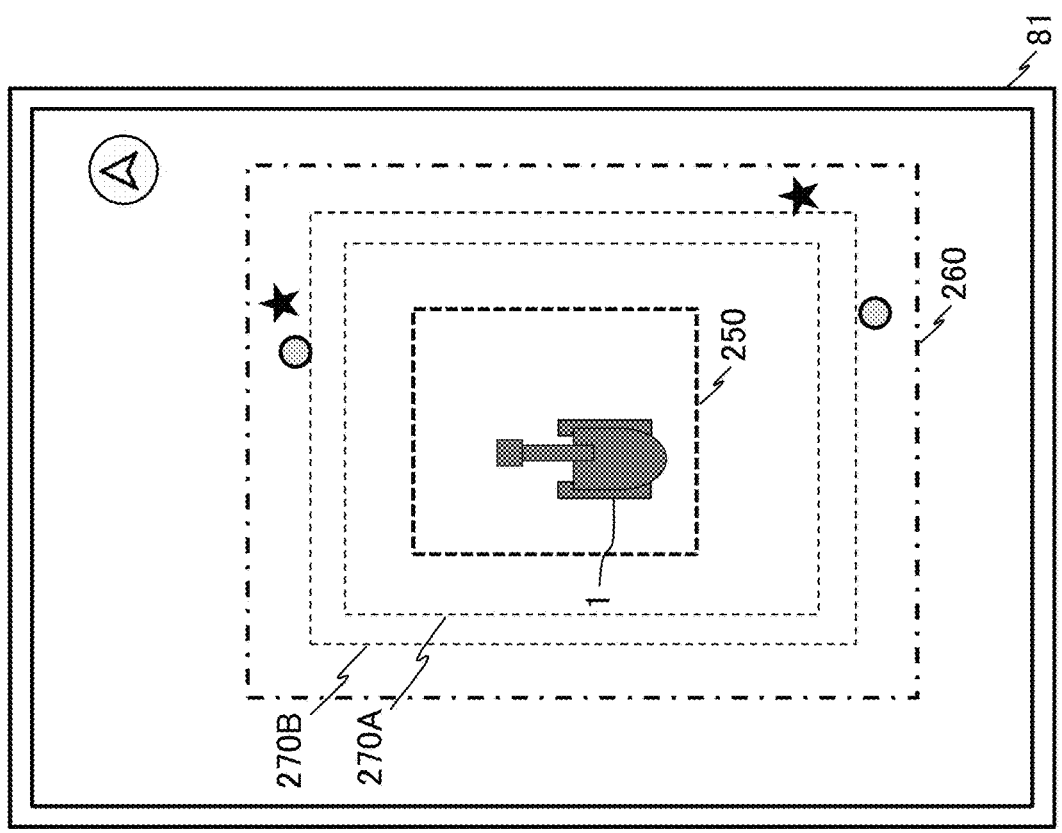
FIG. 15A is a diagram illustrating a display example of a display device of a work machine notification device.

FIG. 15A and FIG. 15B are diagrams illustrating display examples of the display device 81 of the work machine notification device 80.

The worker approach determination section 64 commands the display device 81 so as to render a top view of the work machine 1, the work area 250, the work area notification area 260, and the worker positions included in the worker state notification signal 150 as in the display example illustrated in FIG. 15A. When the rendering is carried out, different display may be employed between the worker who has checked the work area and the worker who has not checked it, i.e. the worker ID about which the work area check flag is "1" and the worker ID about which it is "0." As one example, in FIG. 15A and FIG. 15B, the workers who have checked the work area are illustrated by circle symbols and the workers who have not checked the work area are illustrated by star symbols. Furthermore, in FIG. 15A and FIG. 15B, the first and second approach notification areas 270A and 270B are illustrated by dashed lines as reference lines. The first and second approach notification areas 270A and 270B are not displayed on the display device 81.

Moreover, when a command of approach notification is made, as in the display example illustrated in FIG. 15B, display of a message of approach notification, such as "Worker is approaching! Please check worker" for example, is carried out. In addition, different display from other workers is carried out regarding the worker to which the command of approach notification has been issued. As one example, the worker to which the command of approach notification has been issued is illustrated by an explosion symbol in FIG. 15B. Furthermore, when a command of approach notification is made, the warning device 82 is commanded so as to generate warning sound that notifies about approach of the worker.

According to the present embodiment configured as above, effects shown below are obtained in addition to the effects of the first embodiment.

1. The site management device 30 generates information including the work area check result by the worker 100 in addition to the position of the worker terminal device 40 as the worker information 360A on the basis of the worker signal 140 transistor from the worker terminal device 40.

This allows the operator of the work machine 1 to carry out work while grasping the state of the worker 100 who works near the work machine 1.

2. The work machine information processing device 10 includes the notification device 80 and the work machine information processing device 10 receives the worker state notification signal 150 transmitted by the site management device 30 and notifies the notification device 80 about information on the worker 100 in the work area notification area 260 on the basis of the worker state notification signal 150.

This allows the operator of the work machine 1 to carry out work while grasping the state of the worker 100 who works near the work machine 1.

3. The site management device 30 generates, as the work machine information 350, information including the work area notification area 260 that is set in a predetermined range of the work machine 1 and is the existence area of the worker terminal device 40 that should be notified of the work area 250 in addition to the position and the work area 250 of the work machine 1 on the basis of the machine body signal 110 transmitted from the work machine information processing device 10. Furthermore, when the position of the worker terminal device 40 is in the work area notification area 260, the site management device 30 generates information including the work area check result in addition to the position of the worker terminal device 40 as the worker state information 390 and transmits the worker state notification signal 150 including the worker state information 390 to the work machine information processing device 10.

Due to this, information on whether or not the worker 100 grasps the work area 250 is obtained. Therefore, it becomes possible to carry out work while paying attention particularly to approach of the worker 100 who has not recognized the work area 250 and it becomes easy to previously prevent excessive approach between the work machine 1 and the worker 100.

4. The work machine information processing device 10 sets the first approach notification area 270A with respect to the worker 100 who has checked the work area 250 and the second approach notification area 270B that is with respect to the worker who has not checked the work area 250 and is wider than the first approach notification area 270A, and determines whether or not the worker 100 has checked the work area 250 on the basis of the worker state notification signal 150. When the worker 100 has checked the work area 250, the work machine information processing device 10 carries out first determination about whether or not the position of the worker terminal device 40 included in the worker state notification signal 150 is in the first approach notification area 270A. When the worker 100 has not checked the work area 250, the work machine information processing device 10 carries out second determination about whether or not the position of the worker terminal device 40 is in the second approach notification area 270B. When the position of the worker terminal device 40 is in the first and second approach notification areas 270A and 270B in the first and second determinations, respectively, the work machine information processing device 10 causes the notification device 80 to carry out approach notification.

Due to this, it becomes easy to carry out early dealing with approach of the worker 100 who has not recognized the work area 250 by using the wider approach notification area 270B and it becomes easier to previously prevent contact between the work machine 1 and the worker 100.

DESCRIPTION OF REFERENCE CHARACTERS

1: Work machine
10: Work machine information processing device
30: Site management device
31: Controller for site management
31A: Computation section
31B: Storing section
32: Site management communication device
34: Worker information generating section
35: Work machine information generating section
36: Work area information extraction section
37: Work area notification signal output section
38: Worker information extraction section
39: Worker state signal output section
40: Worker terminal device
42: Worker terminal computation device
42A: Worker signal generating section
42B: Management system communication section
42C: Notification generating section
42D: Notification check determination section
44: Worker notification device
45: Terminal position sensor
46: Worker input device
50: Machine body position sensor
53: Setting input device
55: Work machine communication device
60: Work machine computation device
61: Work area setting section
62: Machine body signal generating section
63: Management system communication section
64: Worker approach determination section
80: Work machine notification device
81: Display device
82: Warning device
100: Worker
110: Machine body signal
130: Work area notification signal
140: Worker signal
150: Worker state notification signal
200: Site management system
250: Work area
260: Work area notification area
270A: First approach notification area
270B: Second approach notification area
310: Work machine list
340: Worker list
350: Work machine information
360: Worker information
360A: Worker information
380: Work area information
390: Worker state information
410: Work area check information

The invention claimed is:

1. A site management system, comprising:
a site management device connected to a worker terminal device carried by a worker; and
a work machine information processing device mounted in a work machine,
wherein the work machine information processing device is configured to generate a machine body signal including a work area within which the work machine operates and which is set on a basis of information input by operation of a setting input device, and transmit the machine body signal to the site management device, wherein the site management device is configured to:

generate worker information including a position of the worker terminal device on a basis of a worker signal transmitted from the worker terminal device, generate work machine information including a position of the work machine and the work area on a basis of a machine body signal transmitted from the work machine information processing device, and generate work area information including the position of the work machine and the work area on a basis of the worker information and the work machine information and transmit a work area notification signal including the work area information to the worker terminal device, wherein the site management device is further configured to generate information including work area update information showing that the work area has been changed, as the work area information, when the work area of the work machine set by an input operation of the setting input device is different from a work area included in a past work area notification signal, and wherein the worker terminal device is configured to notify information of change in the work area to the worker when the work area update information is included in the work area information.

2. The site management system according to claim 1, wherein the site management device is configured to:

generate, as the work machine information, information including a work area notification area set in a predetermined range around the work area in addition to the position of the work machine and the work area on a basis of the machine body signal transmitted from the work machine information processing device, and generate the work area information and transmit the work area information to the worker terminal device when the position of the worker terminal device is in the work area notification area.

3. The site management system according to claim 1, wherein the site management device is configured to:

generate, as the work machine information, information including a work area notification area set in a predetermined range around the work area in addition to the position of the work machine and the work area on a basis of the machine body signal transmitted from the work machine information processing device, and generate information including the work area update information as the work area information and transmit the work area information including the work area update information to the worker terminal device in either a case in which the position of the worker terminal device is in the work area notification area of the work machine and the work area of the work machine is different from a work area included in the work area notification signal of the past or a case in which the worker terminal device enters a new work area notification area and a work area of the work machine that is new is caused to be included in the work area information.

4. The site management system according to claim 1, wherein the site management device is configured to generate worker state information including a work area check result that is a check result by the worker whether the worker has checked the work area, in addition to the position of the worker terminal device as the worker information, on a basis of the worker signal transmitted from the worker terminal device, and transmit a worker state notification signal including the worker state information to the work machine information processing device.

5. The site management system according to claim 4, wherein the site management device is configured to:

generate, as the work machine information, information including a work area notification area set in a predetermined range around the work area in addition to the position of the work machine and the work area on a basis of the machine body signal transmitted from the work machine information processing device, and generate worker state information including the work area check result in addition to the position of the worker terminal device as the worker information when the position of the worker terminal device is in the work area notification area, and transmit the worker state notification signal including the worker information to the work machine information processing device, wherein the work machine information processing device includes a notification device, and wherein the work machine information processing device is configured to:

receive the worker state notification signal transmitted by the site management device, and notify an operator of the work machine by the notification device of information of the worker in the work area notification area on a basis of the work area check result included in the worker state notification signal.

6. The site management system according to claim 1, wherein the worker terminal device is configured to transmit a signal including a position of the worker terminal device oneself to the site management device as the worker signal, wherein the work machine information processing device is configured to transmit a signal including a position of the work machine information processing device oneself and the work area to the site management device as the machine body signal, and wherein the worker terminal device is configured to:

receive the work area notification signal transmitted from the site management device, and notify the worker of the work area on a basis of the work area notification signal.

7. The site management system according to claim 1, wherein the work machine information processing device is configured to:

set a first approach notification area with respect to a worker who has checked the work area and a second approach notification area that is with respect to a worker who has not checked the work area and is wider than the first approach notification area, determine whether the worker has checked the work area on a basis of the work area check result included in the worker state notification signal, and carry out first determination about whether the position of the worker terminal device included in the worker state notification signal is in the first approach notification area when the worker has checked the work area, and carry out second determination about whether or not the position of the worker terminal device is in the second approach notification area when the worker has not checked the work area, and cause the notification device to carry out approach notification to the operator of the work machine when the position of the worker terminal device is in the first or second approach notification area in the first or second determination.

8. A work machine, comprising:
a work machine information processing device connected to a worker terminal device carried by a worker and a site management device,
wherein the work machine information processing device includes:
a setting input device inputting information for setting a work area in which the work machine operates,
a work machine computation device, and
a notification device,
wherein the work machine computation device is configured to:
receive, from the site management device, a worker state notification signal including a position of the worker terminal device based on a worker signal transmitted from the worker terminal device and a work area check result that is a check result by the worker whether the worker has checked the work area, and
notify an operator of the work machine by the notification device of information of the worker in a work area notification area set in a predetermined range around the work machine on a basis of the work area check result included in the worker state notification signal, and
wherein the work machine computation device is configured to:
set a first approach notification area with respect to a worker who has checked the work area and a second approach notification area that is with respect to a worker who has not checked the work area and is wider than the first approach notification area,
determine whether the worker has checked the work area on a basis of the work area check result included in the worker state notification signal, and carry out first determination about whether the position of the worker terminal device included in the worker state notification signal is in the first approach notification area when the worker has checked the work area, and carry out second determination about whether the position of the worker terminal device is in the second approach notification area when the worker has not checked the work area, and
cause the notification device to carry out approach notification to the operator of the work machine when the position of the worker terminal device is in the first or second approach notification area in the first or second determination.

9. A site management system, comprising:
a site management device connected to a worker terminal device carried by a worker; and
a work machine information processing device mounted in a work machine,
wherein the site management device is configured to:
generate worker information including a position of the worker terminal device on a basis of a worker signal transmitted from the worker terminal device,
generate work machine information including a position of the work machine and a work area in which the work machine operates on a basis of a machine body signal transmitted from the work machine information processing device, and
generate work area information including the position of the work machine and the work area on a basis of the worker information and the work machine information and transmit a work area notification signal including the work area information to the worker terminal device,
wherein the site management device is configured to generate information including a work area check result by the worker in addition to the position of the worker terminal device as the worker information on a basis of the worker signal transmitted from the worker terminal device, and
wherein the site management device is configured to:
generate, as the work machine information, information including a work area notification area set in a predetermined range of the work machine in addition to the position of the work machine and the work area on a basis of the machine body signal transmitted from the work machine information processing device,
generate information including the work area check result in addition to the position of the worker terminal device as the worker information when the position of the worker terminal device is in the work area notification area, and
transmit a worker state notification signal including the worker information to the work machine information processing device.

* * * * *